(12) United States Patent
Onodera et al.

(10) Patent No.: US 7,956,480 B2
(45) Date of Patent: Jun. 7, 2011

(54) FAUCET GENERATOR

(75) Inventors: Naoyuki Onodera, Fukuoka (JP);
Tomoko Sato, Fukuoka (JP); Masahiro Kuroishi, Fukuoka (JP); Takeshi Shimizu, Fukuoka (JP)

(73) Assignee: Toto Ltd. (JP)

( * ) Notice: Subject to any disclaimer, the term of this patent is extended or adjusted under 35 U.S.C. 154(b) by 305 days.

(21) Appl. No.: 12/263,460

(22) Filed: Nov. 1, 2008

(65) Prior Publication Data

US 2009/0146431 A1 Jun. 11, 2009

Related U.S. Application Data

(60) Provisional application No. 60/984,734, filed on Nov. 2, 2007, provisional application No. 61/023,080, filed on Jan. 23, 2008.

(30) Foreign Application Priority Data

May 27, 2008 (JP) .............................. P. 2008-137713
Jun. 11, 2008 (JP) .............................. P. 2008-153576

(51) Int. Cl.
*F03B 13/00* (2006.01)
*H02P 9/04* (2006.01)

(52) U.S. Cl. ......................................... 290/54; 290/43
(58) Field of Classification Search .................... 290/43, 290/54; 60/398, 325, 671; 415/2.1, 3.1, 415/62; 166/66.5, 65.1; 310/49.02, 49.03–49.11, 310/75 C, 257

See application file for complete search history.

(56) References Cited

U.S. PATENT DOCUMENTS

| | | | | |
|---|---|---|---|---|
| 3,302,046 A | * | 1/1967 | Brandwijk | 310/49.03 |
| 6,011,334 A | * | 1/2000 | Roland | 310/86 |
| 6,768,218 B2 | * | 7/2004 | Yumita | 290/54 |
| 2002/0047334 A1 | * | 4/2002 | Aoshima | 310/49 R |
| 2006/0214521 A1 | * | 9/2006 | Aoshima | 310/49 R |
| 2006/0273670 A1 | * | 12/2006 | Tung et al. | 310/67 R |
| 2007/0069600 A1 | * | 3/2007 | Hiramatsu | 310/156.32 |
| 2009/0072674 A1 | * | 3/2009 | Yamawaki et al. | 310/49 R |

FOREIGN PATENT DOCUMENTS

| | | | |
|---|---|---|---|
| JP | 2004-336982 A | | 11/2004 |
| JP | 2004336982 A | * | 11/2004 |

* cited by examiner

*Primary Examiner* — Julio Gonzalez Ramirez
(74) *Attorney, Agent, or Firm* — Kimble Intellectual Property Law, PLLC

(57) ABSTRACT

A faucet generator includes a case having water inflow and outflow ports and in which a water supply channel is formed, a rotor vane disposed inside the water supply channel, a magnet which is rotatable integrally with the rotor vane, a bearing which supports a force that the rotor vane receives from a water flow, a coil which produces an electromotive force by a rotation of the magnet, and a yoke having a base part surrounding the coil and a plurality of inductors spaced apart from each other and extending from the base part. The coil is spaced apart from the magnet in an axial direction of a rotation center axis of the magnet and is disposed to face the magnet, the magnet is magnetized on an outer circumferential face which intersects with a plane perpendicular to the rotation center axis, and the inductors are disposed outside the case to face the outer circumferential face of the magnet.

16 Claims, 31 Drawing Sheets

FIG. 16
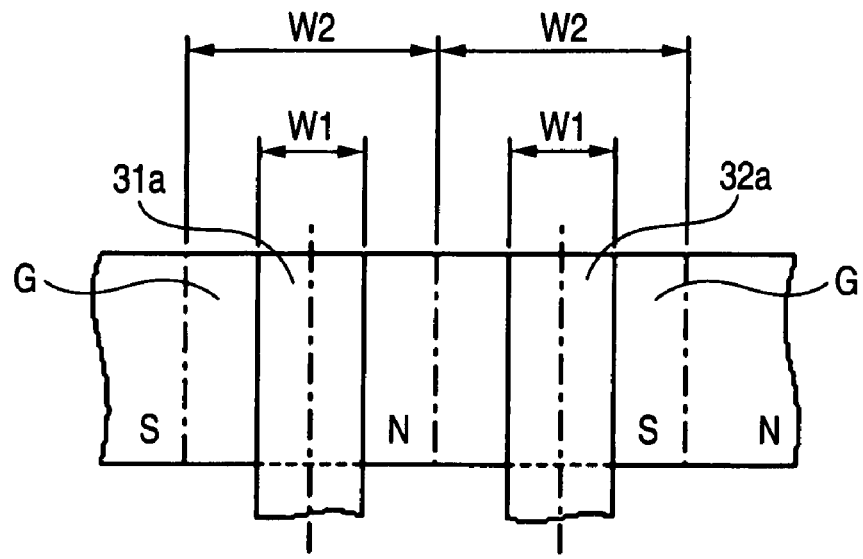
FIG. 17A　　FIG. 17B　　FIG. 17C
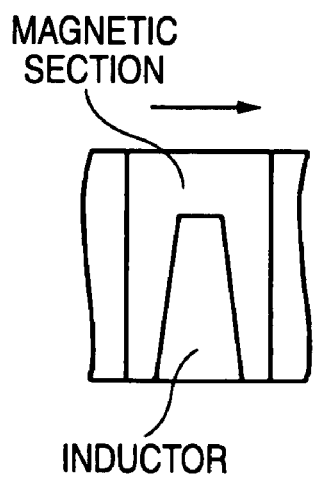
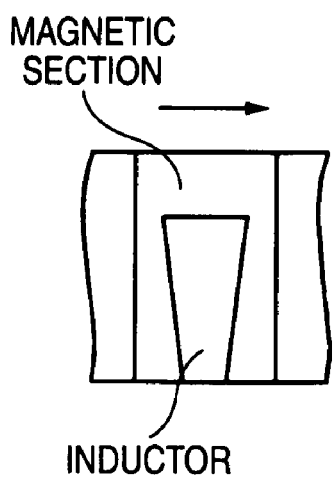
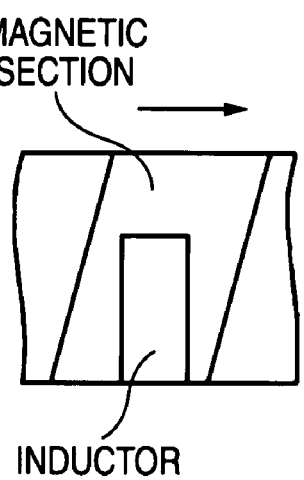

US 7,956,480 B2

FAUCET GENERATOR

CROSS-REFERENCE TO RELATED APPLICATION(S)

This application is a non-provisional application claiming priority from U.S. Provisional Application No. 60/984,734 filed on Nov. 2, 2007, U.S. Provisional Application No. 61/023,080 filed on Jan. 23, 2008, Japanese Patent Application No. 2008-137713 filed on May 27, 2008, and Japanese Patent Application No. 2008-153576 filed on Jun. 11, 2008, the entire contents of which are incorporated herein by reference.

FIELD OF THE INVENTION

The present invention relates to a faucet generator which generates electricity by using a flow of water supply, and also to a faucet apparatus including the generator.

DESCRIPTION OF RELATED ART

Conventionally, an automatic faucet apparatus has been known in which a hand introduced under a tap is sensed by a sensor, and water is automatically discharged from the tap. Also an apparatus has been known in which a small generator is disposed in a channel of such an automatic faucet apparatus, an electric power obtained by the generator is stored, and the stored power is supplied additionally to a circuit such as the sensor (see, e.g., JP-2004-336982 A).

In such a faucet apparatus, an axial flow generator which can be easily miniaturized is used. As an axial flow generator, there are a generator having "radial arrangement" in which a coil is disposed radially outside a magnet through an inductor (see, e.g., FIG. 4 of JP-2004-336982 A), and that having "axial arrangement" in which a coil is disposed through an inductor so as to be opposed to an end face of a magnet with respect to a water supply channel (see, e.g., FIG. 5 of JP-2004-336982 A). In the generator having "radial arrangement", magnetic fluxes are exchanged in a radial direction between the magnet and the inductor. Therefore, the generator has a feature that an electromagnetic force acts in a radial direction. In the generator having "axial arrangement", by contrast, magnetic fluxes are exchanged in the axial direction between the magnet and the inductor. Therefore, the generator has a feature that an electromagnetic force acts in the axial direction.

In an application where a generator having a small radial dimension is required, a generator having "axial arrangement" is used more preferably than the generator having "radial arrangement". In such an axial generator having "axial arrangement", however, the direction in which the water flow acts coincides with that in which the electromagnetic force acts, and hence the following problems arise.

Since the direction in which the water flow acts coincides with that in which the electromagnetic force acts, first, a rotary member (rotor vane portion) receives a strong urging force in one direction, and a rotation sliding surface is easily worn. Therefore, the distance between the magnet and the inductor is changed in a short time from a start of use, and the electromagnetic force acting therebetween, and the amount of magnetic fluxes exchanged therebetween are changed. As a result, the electric-generating capacity fluctuates as time elapses.

Since the rotation sliding surface is easily worn, moreover, also a channel which is formed in a case and between the magnet and the inductor is narrowed in a short time from the start of use. Therefore, the channel is easily clogged by dust flowing through water. Even when the magnet is caused to slightly vibrate by the water flow, the magnet easily interferes with the inner wall face of the case. Namely, the reliability as a faucet generator is low.

SUMMARY OF THE INVENTION

The present invention provides a faucet generator in which, while the size in a radial direction is reduced, the fluctuation of electric-generating capacity is suppressed for a long time, and a high reliability is maintained for a long time.

According to an aspect of the invention, the faucet generator includes a case having a water inflow port and a water outflow port and in which a water supply channel is formed, a rotor vane disposed inside the water supply channel, a magnet which is rotatable integrally with the rotor vane, a bearing which supports a force that the rotor vane receives due to a water flow, a coil which produces an electromotive force by a rotation of the magnet, and a yoke having a base part arranged to surround the coil and a plurality of inductors which are spaced apart from each other and extending from the base part. The coil is spaced apart from the magnet in an axial direction of a rotation center axis of the magnet and is disposed to face the magnet, the magnet is magnetized on an outer circumferential face thereof which intersects with a plane perpendicular to the rotation center axis, and the inductors are disposed outside the case to face the outer circumferential face of the magnet.

Other aspects and effects of the invention will be apparent from the following description, drawings, and claims.

BRIEF DESCRIPTION OF THE DRAWINGS

FIG. 16 is a schematic view illustrating relationships between the dimensions of the inductors and the magnetic section of the magnet;

FIGS. 17A to 17C are schematic views illustrating relationships between the shape of the inductors and that of the magnetic sections;

DETAILED DESCRIPTION OF EXEMPLARY EMBODIMENTS

Figure 1:
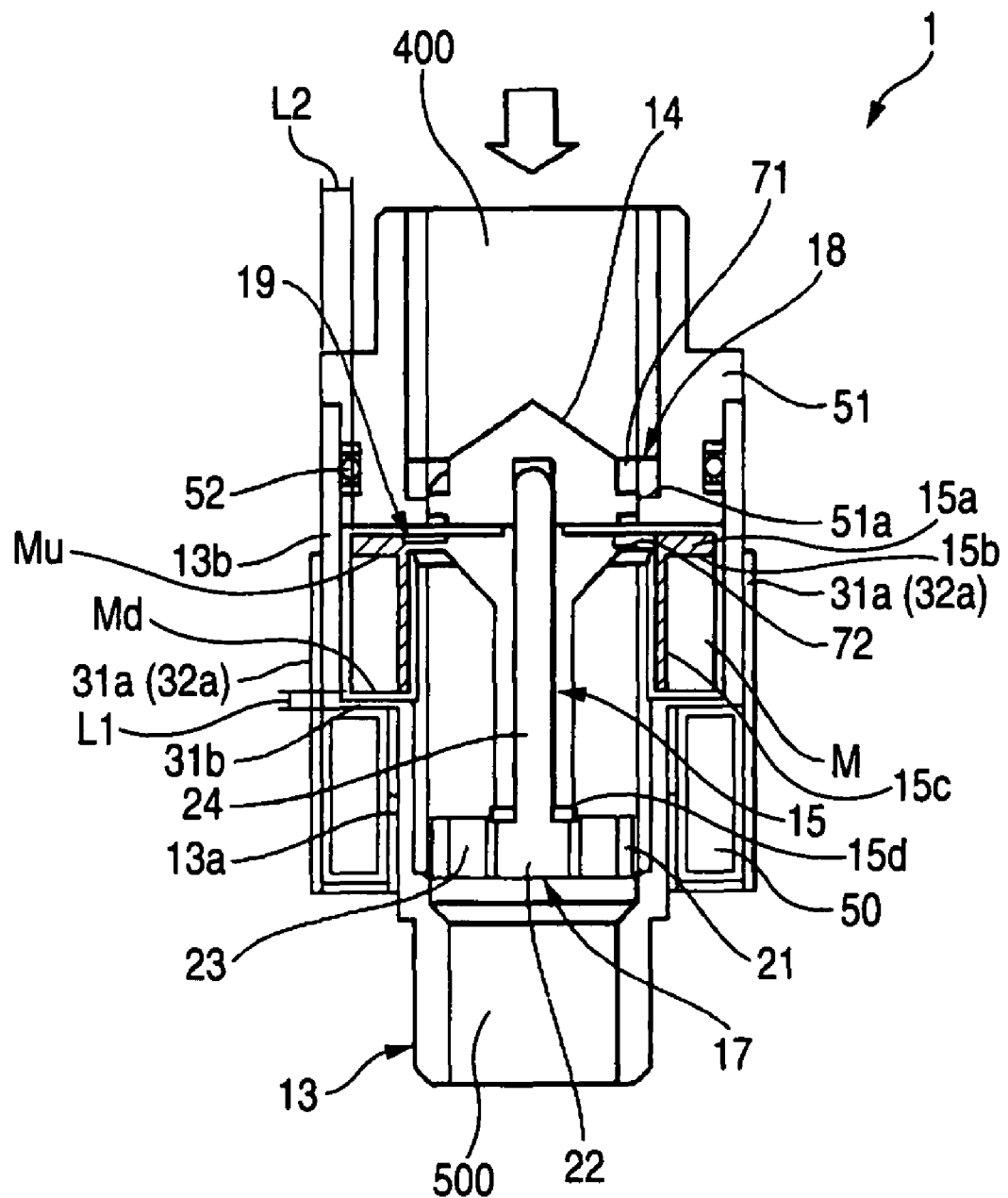
FIG. 1 is a schematic sectional view of a generator of a first embodiment of the invention.

According to embodiments of the invention, the force which is received by a rotor vane and a magnet from a water flow (hereinafter, referred to as the load due to the water flow) is supported by a bearing. The direction in which the load due to the water flow is applied is "a direction which is oriented from the upstream side of a water supply channel to the downstream side", and "the direction which is oriented from the upstream side of the water supply channel to the downstream side" is "a direction which is substantially parallel to the rotation center axis of the magnet". By contrast, a direction in which a magnetic force is exchanged between the magnet and inductors, and an electromagnetic force acts is "a direction which intersects with the rotation center axis of the magnet". Namely, the direction in which the electromagnetic force acts does not coincide with that in which the load due to the water flow is applied. Therefore, a structure is obtained in which, in addition to the load due to the water flow, the electromagnetic force does not completely act on the bearing, and the rotation sliding surface is less likely to be worn.

With respect to "the direction which intersects with the rotation center axis of the magnet", a perpendicular intersection at 90 deg. is most preferable, and an intersection at 45 deg. or more is preferable. In an intersection at 45 deg., the action of the electromagnetic force can be equally divided into "the direction which intersects with the rotation center axis of the magnet" and "the direction which is substantially parallel to the rotation center axis of the magnet", the electromagnetic force which acts on the bearing can be sufficiently reduced, and it is possible to obtain an effect that wear of the rotation sliding surface is suppressed.

According to the embodiments of the invention, the rotation sliding surface is hardly worn for a long time. With respect to a water supply channel which is formed between the magnet and the inductors, therefore, a constant distance can be maintained, dust clogging and interference due to vibration of the magnet hardly occur, and a high reliability can be maintained for a long time.

Moreover, the direction in which the electromagnetic force acts is made not completely coincident with that in which the load due to the water flow is applied, whereby, even when the rotation sliding surface is worn, the distance between the magnet and the inductors can be suppressed from being changed, and a stable electric-generating capacity can be obtained for a long time.

Hereinafter, a first embodiment of the invention will be described with reference to FIGS. 1 to 24. In the figures, identical components are denoted by the same reference numerals.

FIG. 1 is a schematic sectional view of a generator 1 of the first embodiment of the invention.

The generator 1 includes a water inflow port 400, a water outflow port 500, a cylindrical body 13, a pre-rotation stator vane 14, a rotor vane 15, a magnet M, a coil 50, and a sealing member 51. These components are housed in a case 12 (see FIG. 3). The arrow which is drawn above the pre-rotation stator vane 14 indicates the direction of the water flow.

Prior to description of the generator 1, an automatic faucet apparatus 3 including the generator 1 will be described.

Figure 2:
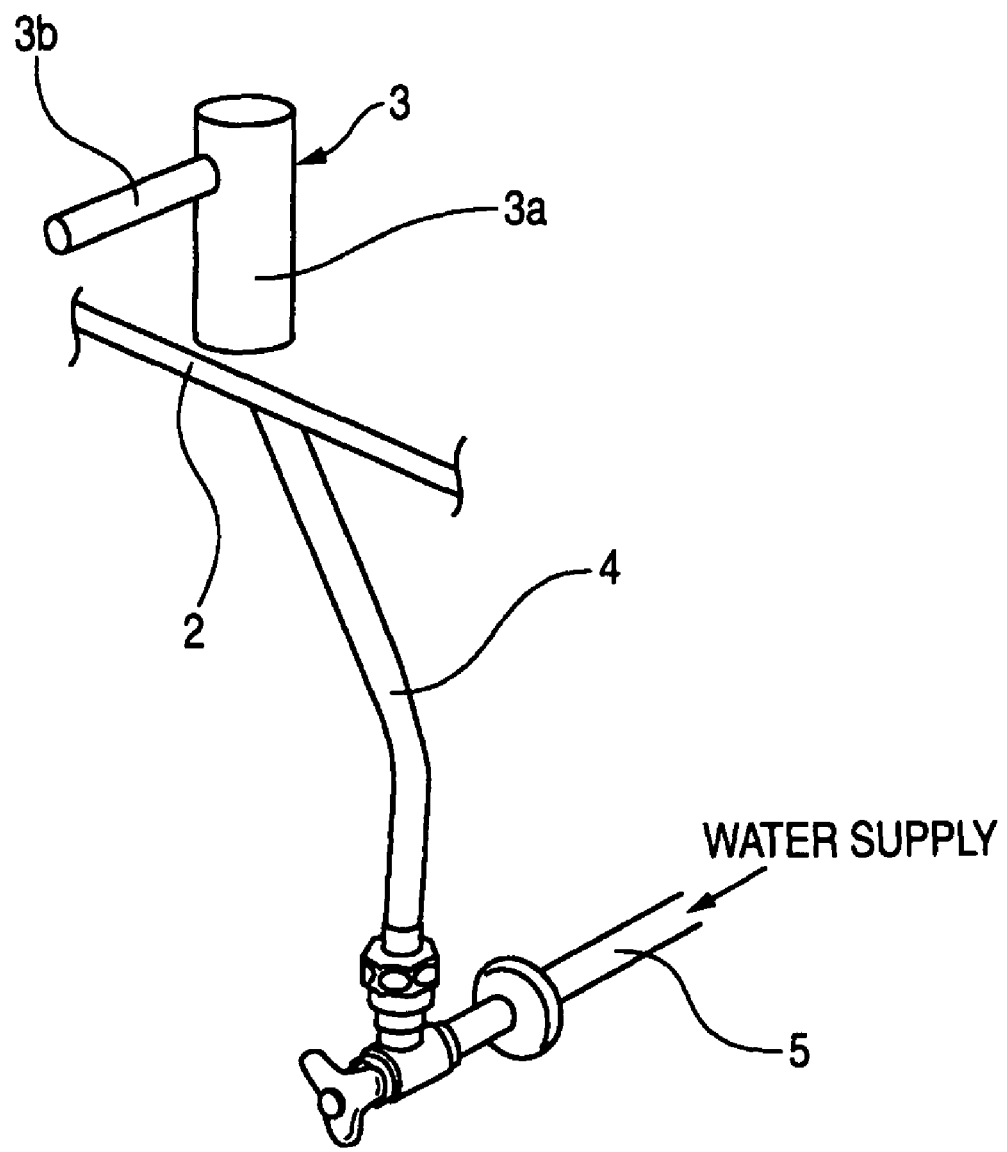
FIG. 2 is a schematic view illustrating an example of mounting of an automatic faucet apparatus including the generator of the embodiment of the invention.
Figure 3:
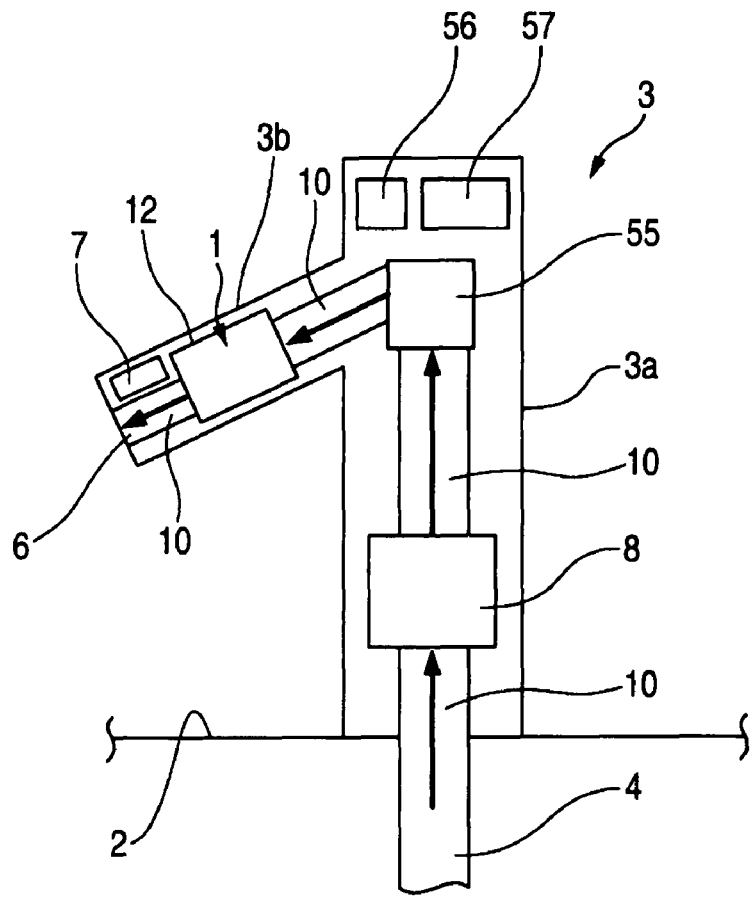
FIG. 3 is a schematic sectional view of the automatic faucet apparatus.

FIG. 2 is a schematic view illustrating an example of mounting of the automatic faucet apparatus 3, and FIG. 3 is a schematic sectional view of the automatic faucet apparatus 3. In the figures, the arrows indicate the direction of the water flow.

The automatic faucet apparatus 3 is mounted in, for example, a washstand 2. The automatic faucet apparatus 3 is connected to a water inflow port 5 for tap water or the like, through a piping 4. The automatic faucet apparatus 3 has a cylindrical body 3a, and a water discharger 3b which is disposed in an upper portion of the body 3a, and which extends in a radially outward direction of the body 3a. A water discharging port 6 is formed at the tip end of the water discharger 3b, and a sensor 7 is incorporated in the vicinity of the water discharging port 6.

A water supply channel 10 which guides water that inflows from the water inflow port 5 and flows through the piping 4, to the water discharging port 6 is formed inside the automatic faucet apparatus 3. The body 3a incorporates a solenoid valve 8 which opens and closes the water supply channel 10, and, on the downstream side of the solenoid valve 8, a constant flow valve 55 which restricts the amount of water discharge to a constant value. A reducing valve or regulating valve which reduces the water supply pressure in the case where the water supply pressure of tap water or the like is higher than the use pressure is incorporated in the upstream side of the solenoid valve 8. The constant flow valve 55, the reducing valve, and the regulating valve may be adequately disposed as required.

The generator 1 is disposed inside the water discharger 3b, and on the downstream side of the constant flow valve 55. A charger 56 which stores the power generated by the generator 1, and a controller 57 which controls the driving of the sensor 7 and the opening and closing operations of the solenoid valve 8 are disposed inside the body 3a. Since the generator 1 is disposed downstream from the solenoid valve 8 and the constant flow valve 55, the water supply pressure (primary pressure) of the tap water does not directly act on the generator 1. Therefore, the generator 1 is not requested to have a high pressure tightness, and this arrangement is advantageous in reliability and cost.

The charger 56 and the controller 57 are connected to each other through wirings, and placed at positions which are in an upper portion of the body 3a and above the highest position of the water supply channel 10. Even when a water drop due to a condensation on the outer face of a channel piping forming the water supply channel 10 falls or flows down along the channel piping, therefore, it is possible to prevent the controller 57 from being submerged, and also a failure of the controller 57 from occurring. Similarly, also the charger 56 is disposed above the water supply channel 10. Therefore, it is possible to prevent the charger 56 from being submerged, and also a failure of the charger 56 from occurring.

The coil 50 (see FIG. 5) disposed in the generator 1, and the controller 57 are connected to each other through wirings, thereby enabling the output of the coil 50 to be sent to the charger 56 through the controller 57.

The generator 1 is not restricted to be disposed inside faucet metal fittings (the body 3a and the water discharger 3b) of the faucet apparatus 3. For example, the faucet generator may be disposed in the piping (channel) 4 which connects between the faucet metal fittings of the faucet apparatus 3 and a stop cock (main cock) that is disposed upstream thereof.

The automatic faucet apparatus 3 is preferably used in a living environment. Examples of the purpose of use are a kitchen faucet apparatus, a living-dining faucet apparatus, a shower faucet apparatus, a bathroom faucet apparatus, and a lavatory faucet apparatus. The application of the generator 1 is not restricted to the automatic faucet apparatus 3 using the human body detecting sensor 7. For example, the generator may be applied also to a one-touch faucet apparatus which is operated by on/off operations of a manual switch, a constant volume discharging faucet apparatus which counts the flow amount to stop the water flow, a timer faucet apparatus which, when a preset time elapses, stops the water flow, and the like. The generated electric power may be used in, for example, lighting up, production of electrolyzed functional water such as ionized alkaline water or water containing silver ions, display (measurement) of the flow amount, display of a temperature, and voice guidance.

In the faucet apparatus to which the generator 1 is applied, for example, the discharge flow amount is set to 100 liters or less per minute, or preferably 30 liters or less per minute. In a lavatory faucet, particularly, the discharge flow amount is preferably set to 5 liters or less per minute. In the case where the discharge flow amount is relatively large, such as a bathroom faucet, it is preferable that the water flow flowing from a water supply pipe to the generator 1 is branched to adjust the amount of the flow flowing through the generator 1 to 30 liters or less per minute. This is because, when the whole of the water flow is supplied to the generator 1, the rotation number of the rotor vane 15 is excessively increased, and there is a fear that noises or shaft wear is increased. When, although the rotation number is increased, the rotation number is not an adequate one or lower, an energy loss is caused by the Joule heat produced by an eddy current or the current flow through the coil, and hence the electric-generating capacity is not increased. In Japan, for example, the water pressure of a water pipe to which the faucet apparatus is mounted may be sometimes as low as about 0.05 (MPa).

Although the faucet apparatus including the generator 1 of the first embodiment has been described, also generators 1001, 2001 of other embodiments which will be described later can be applied to such a faucet apparatus.

Next, referring again to FIG. 1, the generator 1 will be described.

The cylindrical body 13 has a stepped shape consisting of a small-diameter portion 13a and a large-diameter portion 13b, and is disposed in the water discharger 3b which is shown in FIGS. 2 and 3, in a state where the interior of the cylindrical body communicates with the water supply channel. In this case, the cylindrical body is disposed in such a manner that the center axis direction of the cylindrical body 13 is substantially parallel to the direction of the water flow, the small-diameter portion 13a is directed toward the upstream side, and the large-diameter portion 13b is directed toward the downstream side.

In the cylindrical body 13, in the sequence starting from the upstream side, the pre-rotation stator vane 14, the rotor vane 15, and the bearing 17 are disposed. The bearing 17 is disposed inside the small-diameter portion 13a, and the pre-rotation stator vane 14 and a part of the rotor vane 15 are disposed inside the large-diameter portion 13b.

The opening at the upstream end of the large-diameter portion 13b is liquid-tightly closed by the sealing member 51 through an O-ring 52. A stepped hole is disposed inside the sealing member 51. A step portion 51a of the member is annularly formed, and the pre-rotation stator vane 14 is supported on the step portion 51a.

The pre-rotation stator vane 14 has a shape in which a conical member is disposed integrally on one end face (the face positioned on the upstream side) of a columnar member. A plurality of projective stator vane blades 18 which are projected in a radially outward direction are disposed on the circumferential face of the pre-rotation stator vane 14. The stator vane blades 18 are inclined from the upstream side toward the downstream side while being twisted in the rightward direction about the axis center of the pre-rotation stator vane 14. Each space which is between the stator vane blades 18 that are adjacent to each other in the circumferential direction functions as a stator vane channel 71. The pre-rotation stator vane 14 is fixed to the cylindrical body 13, and is not rotated.

The rotor vane 15 is disposed on the downstream side of the pre-rotation stator vane 14. The rotor vane 15 has a columnar shape, and a plurality of projective rotor vane blades 19 which are projected in a radially outward direction are disposed on the circumferential face of the rotor vane. Contrary to the stator vane blades 18, the rotor vane blades 19 are inclined from the upstream side toward the downstream side while being twisted in the leftward direction about the axis center. Each space which is between adjacent ones of the rotor vane blades 19 that are adjacent to each other in the circumferential direction functions as a rotor vane channel 72.

A center shaft 24 is disposed so as to be projected toward the upstream side from the bearing 17. The center shaft 24 is integrated with the bearing 17. The rotor vane 15 is disposed such that the center shaft 24 is inserted therein, and is rotatable about the center shaft 24. When, for example, a sliding ring 15d made of a material having an excellent sliding property is disposed on the bearing 17, the rotor vane 15 is smoothly rotated, and the fluid energy can be prevented from being lost. Alternatively, the rotor vane 15 and the center shaft 24 may be integrated with each other, and both end portions of the center shaft 24 are supported by the pre-rotation stator vane 14 and the bearing 17, so that the rotor vane 15 which is integrated with the center shaft 24 is rotated.

The bearing 17 includes: the ring member 21 which is fixed to the inner circumferential face of the cylindrical body 13; and the shaft supporting portion 22 which is disposed at the center of the ring member 21. The ring member 21 and the shaft supporting portion 22 are coupled to each other by the coupling members 23 which are radiately disposed. The gaps between the coupling members 23 are not closed, and are passed through the bearing. Therefore, the water flow inside the cylindrical body 13 is not disturbed.

A rotor vane ring 15a which is fixed to the side end faces of the rotor vane blades 19 on the radially outer side, and the annular magnet M which is fixed to an outer circumferential portion of the rotor vane ring 15a are housed inside the large-diameter portion 13b of the cylindrical body 13. The coil 50 is disposed outside the small-diameter portion 13a of the cylindrical body 13 so as to be opposed to the downstream side of the magnet M in the water supply channel. The rotor vane ring 15a is not always required. In the case where the ring is disposed, however, the rotor vane 15 and the magnet M can be more firmly integrated with each other. As shown in FIG. 1, the rotor vane ring 15a may be formed into an inverted L-like section shape, and the ring may be bonded to the magnet M in the upstream end face 15b in the water supply channel, in addition to the ring circumferential face 15c. Alternatively, the rotor vane ring 15a may be formed into an L-like section shape, and the ring may be bonded to the magnet M in the downstream end face in the water supply channel, in addition to the circumferential face 15c. Alternatively, the ring may be bonded to the magnet M in only the circumferential face 15c.

According to the above-described configuration, the coil 50 is opposed to the downstream side of the magnet M, and hence the radial dimension can be reduced as compared with the case where the coil 50 is opposed to the radially outside of the magnet M. Furthermore, the radial dimension of the rotor vane 15 can be increased by a degree corresponding to the configuration in which the coil 50 is not disposed radially outside the rotor vane 15, so that the electric-generating capacity can be increased.

In the case where the cylindrical body 13 is formed by a material having a low electrical conductivity, such as a resin, the eddy current loss can be reduced as compared with the case where the cylindrical body is formed by a metal, and hence the electric-generating capacity can be further increased. In this case, only the large-diameter portion 13b through which magnetic fluxes are passed may be formed by a material having a low electrical conductivity, such as a resin.

Next, the magnet M and a stator 9 will be described.

Figure 4:
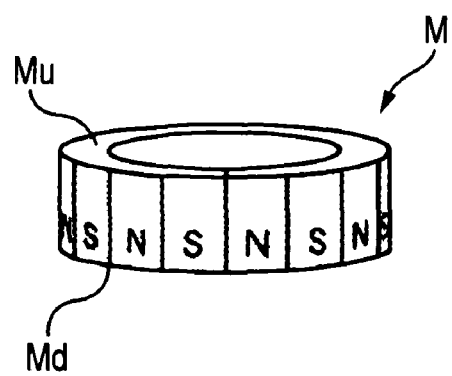
FIG. 4 is a schematic perspective view of a magnet.
Figure 5:
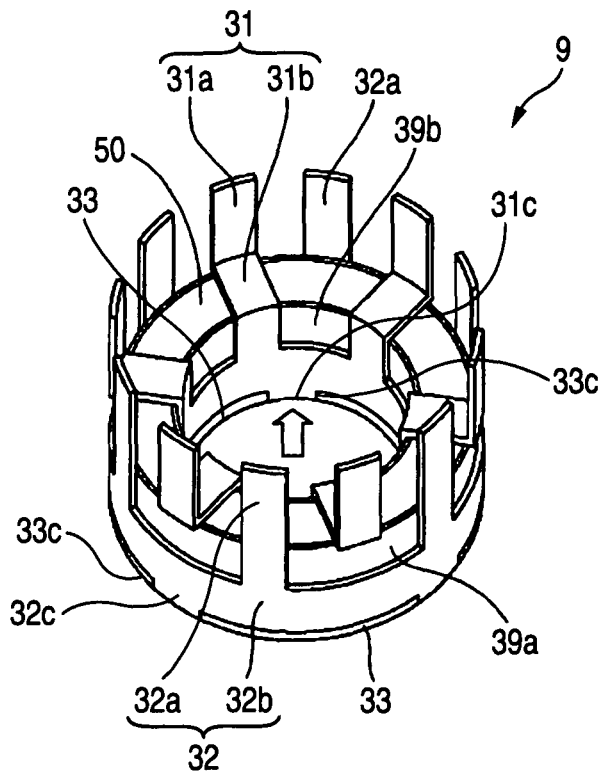
FIG. 5 is a schematic perspective view of a stator.

FIG. 4 is a schematic perspective view of the magnet M, and FIG. 5 is a schematic perspective view of the stator 9.

As shown in FIG. 4, the magnet M is alternately magnetized with N and S poles along the circumferential direction in the outer circumferential face which intersects with a plane perpendicular to the rotation center axis of the magnet M (hereinafter, the face is referred to as the outer circumferential face of the magnet M). Although slight in amount, the magnetic fluxes from the N and S poles leak to the upstream end face Mu and downstream end face Md of the magnet M with respect to the water supply channel. The amount can be controlled by the magnetizing method. In the magnet M, magnetization is performed on one component which is molded into a cylindrical shape, or magnetization is performed on each of a plurality of components which are molded into a tile-like shape, and then the components are bonded together to be molded into a cylindrical shape. In the former case, the number of production steps can be reduced, and, in the latter case, a magnetic circuit for performing magnetization can be simplified.

The stator 9 includes yokes 31, 32, 33, and the coil 50 which is housed in a space surrounded by the yokes 31, 32, 33. In the coil 50 which is wound in a cylindrical shape, the inner and outer circumferential faces and the end faces are surrounded by the yokes 31, 32, 33 all of which are formed by a magnetic material. The first yoke 31 has a base part 31b which surrounds the inner circumferential face and upper end face of the coil 50, and a plurality of inductors 31a which extend from the base part 31b, and which are separated from one another. The second yoke 32 has a base part 32b which surrounds the outer circumferential face of the coil 50, and a plurality of inductors 32a which extend from the base part 32b, and which are separated from one another.

The base part 31b of the first yoke 31 has a substantially cylindrical shape, and is placed along the inner circumferential face of the coil 50. The plurality of inductors 31a are integrally disposed toward the axial direction, in one end portion of the yoke in the axial direction. The inductors 31a are placed at regular intervals along the circumferential direction of the coil 50.

The base part 32b of the second yoke 32 has a substantially cylindrical shape, and is placed so as to surround the outer circumferential face of the coil 50. The plurality of inductors 32a are integrally disposed toward the axial direction, in one end portion of the yoke in the axial direction. The inductors 32a are placed at regular intervals along the circumferential direction of the coil 50, and placed among the inductors 31a of the first yoke 31. Namely, the inductors 31a of the first yoke 31, and the inductors 32a of the second yoke 32 are arranged alternately and separately from one another in the circumferential direction of the coil 50. The inductors 31a, 32a are disposed immediately above the base part 32b of the second yoke 32, and the distances from the center of the coil 50 to the inductors 31a, 32a are approximately equal to each other.

The inductors 31a, 32a are disposed outside the case 13. Their inner circumferential faces are disposed so as to be opposed to the outer circumferential face of the magnet M which is a magnetized face. The magnetic fluxes from the outer circumferential face of the magnet M are guided to the coil 50 through the inductors 31a, 32a, and the directions of the magnetic fluxes are changed in accordance with rotation of the magnet M, thereby performing electricity generation. Therefore, the distance L2 (see FIG. 1) between the outer circumferential face of the magnet M and the inductors 31a, 32a largely affects the amount of the magnetic fluxes which are guided to the coil 50, and exerts a great influence on the electric-generating capacity.

The direction in which the load due to the water flow is applied is "the direction which is oriented from the upstream side of the water supply channel to the downstream side", and substantially parallel to the center shaft 24. On the other hand, the direction in which the magnetic force acts between the magnet M and the inductors 31a, 32a is substantially perpendicular to the center shaft 24. Therefore, the bearing 17 receives the load due to the water flow, but does not receive the action of the electromagnetic force. As shown in FIG. 1, therefore, the rotor vane 15 which is disposed so as to pass through the center shaft 24 is rotated, and, in the case where the sliding ring 15*d* is disposed on the sliding face of the rotor vane 15, wear of the sliding ring 15*d* can be suppressed.

In the case where the rotor vane 15 integrated with the center shaft 24 is rotated, the sliding face of rotation in the center shaft 24 can be suppressed from being worn. As a result, the distance L1 (see FIG. 1) between the downstream end face Md of the magnet M and the base part 31*b* opposed thereto is hardly narrowed even when the time elapses. Namely, also the width of the channel which is formed between the downstream end face Md of the magnet M and the base part 31*b* is hardly changed. Therefore, dust clogging, and the phenomenon where the magnet M is caused to vibrate by the water flow to interfere with the inner wall of the case 13 can be prevented for a long time from occurring, and the reliability of the generator 1 can be improved.

The distance L2 between the outer circumferential face of the magnet M and the inductors 31*a*, 32*a* is not affected by the action of the water flow. Therefore, the distance is not changed for a long time, and the fluctuation of the electric-generating capacity due to temporal change can be suppressed while the dimension in a radial direction is reduced by "axial arrangement".

Furthermore, the coil 50 is opposed to the downstream end face Md of the magnet M. Since the coil 50 is disposed on the downstream side of the magnet M, i.e., on the side opposite to the pre-rotation stator vane 14 as described above, the pre-rotation stator vane 14 is hardly restricted in shape and size. When the size of the pre-rotation stator vane 14 is increased, a swirling flow which is effective in rotation of the rotor vane 15 can be formed while suppressing the pressure loss.

The third yoke 33 has a ring plate-like shape, and is disposed to be opposed to the lower end face portion of the coil 50. A part of the outer circumferential side of the third yoke 33 is cut away so that a wiring takeout portion through which wirings from the coil 50 are drawn out is formed.

The third yoke 33 is coupled to end portions of the respective first and second yokes 31, 32 which are opposite to the end portions where the inductors 31*a*, 32*a* are disposed. The wirings from the coil 50 are drawn out from the wiring takeout portion which is formed in the outer circumferential side of the third yoke 33 to the outside. In this way, the wirings of the coil 50 are drawn out from the outer circumferential side to the outside through the wiring takeout portion which is formed in the outer circumferential side of the third yoke 33. As compared with the case where the wirings are drawn out from the inner circumferential side, therefore, the wirings to the controller 57 are laid more easily.

For example, concave-like positioning portions 33*c* are disposed in the third yoke 33. When the positioning portions 33*c* are engaged with convex-like positioning portions 31*c* formed in the first yoke 31 and convex-like positioning portions 32*c* formed in the second yoke 32. In FIG. 5, on the outer circumferential side of the coil 50, the positioning portions 33*c*, 32*c* of the third yoke 33 and the second yoke 32 are engaged with each other, and, on the inner circumferential side of the coil 50, the positioning portions 33*c*, 31*c* of the third yoke 33 and the first yoke 31 are engaged with each other. According to the configuration, the first yoke 31 and the second yoke 32 are positioned at respective predetermined circumferential positions, and the pitch accuracy between the inductors 31*a*, 32*a* can be improved. Alternatively, convex-like cutout portions may be disposed in the third yoke 33, and concave-like positioning portions may be disposed in the first and second yoke 31, 32.

In portions of the second yoke 32 which correspond to the inductor 31*a* of the first yoke 31 in the circumferential direction, cutout portions 39*a* are formed along the outer circumferential face of the coil 50. In portions of the first yoke 31 which correspond to the inductors 32*a* of the second yoke 32 in the circumferential direction, cutout portions 39*b* are formed along the inner circumferential face of the coil 50. In this way, the cutout portions 39*a*, 39*b* are intermittently disposed, whereby the yokes 31, 32 are magnetically insulated from each other in the circumferential direction. In the magnetic path which is formed along the circumferential faces of the yokes 31, 32, portions which are not required for electricity generation are cut away, so that a short circuit of the magnetic path and the iron loss can be suppressed, and the electric-generating capacity can be increased. In other words, the effect of unifying the directions of magnetic fluxes is attained by the cutting directions and shapes of the cutout portions 39*a*, 39*b*, and hence it is possible to form a magnetic path which is effective in electricity generation. In the case of the first embodiment, the directions of the cutouts are parallel to the axis of the coil 50, and the effect of unifying the directions of magnetic fluxes in the direction of the arrow in FIG. 5 is high. When the directions of magnetic fluxes are unified in the axial direction of the coil 50, the effect of increasing the electric-generating capacity is further enhanced.

Hereinafter, the effect of the cutout portions 39*a*, 39*b* will be described.

Figure 6:
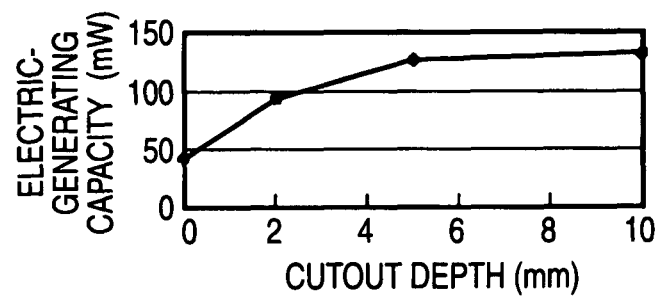
FIG. 6 is a graph chart showing relationships between the depth of cutout portions and the electric-generating capacity.

FIG. 6 is a graph chart showing relationships between the depth of the cutout portions 39*a*, 39*b* and the electric-generating capacity. The abscissa indicates the depth (mm) of the cutout portions 39*a*, 39*b*, and the ordinate indicates the electric-generating capacity (mW).

Figure 7:
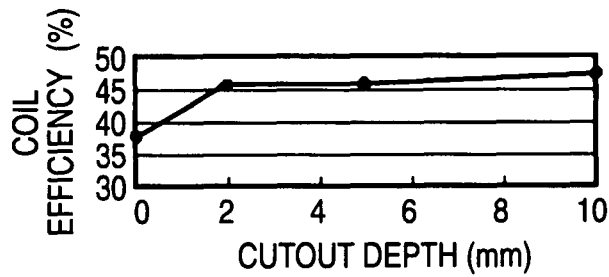
FIG. 7 is a graph chart showing relationships between the depth of the cutout portions and the coil efficiency.

FIG. 7 is a graph chart showing relationships between the depth of the cutout portions 39*a*, 39*b* and the coil efficiency. The abscissa indicates the depth H (mm) of the cutout portions 39*a*, 39*b*, and the ordinate indicates the coil efficiency (%).

The electric-generating capacity and the coil efficiency were simulated while the depth (the length from the upper end face of the coil 50 in the axial direction) of the cutout portions 39*a*, 39*b* was changed to 0 mm, 2 mm, 5 mm, and 10 mm. The coil efficiency indicates the rate (%) of the output (electric-generating capacity) with respect to the input (torque required for rotating the magnet M×number of rotations). The dimension of the whole stator 9 in the axial direction was set to 27 mm. The configuration where the depth of the cutout portions 39*a*, 39*b* is 0 mm means the case where the cutout portions 39*a*, 39*b* are not disposed.

From FIG. 6, it is seen that, when the depth of the cutout portions 39*a*, 39*b* is made large, the electric-generating capacity can be increased. As seen from FIG. 7, furthermore, when the depth of the cutout portions 39*a*, 39*b* is made large, also the coil efficiency can be improved.

In the case of an automatic faucet including a generator, it is necessary to incorporate a solenoid valve and the generator, and hence the generator must be compactly formed. In order that the electric-generating capacity is ensured even when the generator is made compact, the efficiency of the coil must be improved. The effect due to the disposition of cutout portions is large. Moreover, the disposition of cutout portions is preferable also in prevention of the efficiency reduction due to heat generation. In a faucet generator, it is necessary to prevent iron powder in water from being attracted to a magnet, and hence a strong magnet cannot be used. Therefore, the cutout portions which efficiently form a magnetic path are very effective. Particularly, the cutout portions are further effective in a generator to be used in a faucet such as a lavatory faucet in which the water-saving effect is requested, and the hydro energy that can be used in electricity generation is relatively small.

Alternatively, the cutout portions 39a, 39b may be formed in the whole in the axial direction. In this case, the yokes 31, 32 are divided correspondingly with the number of the inductors. When the number of components and the assembling property are considered, therefore, the depth of the cutout portions 39a, 39b is preferably restricted to a middle of the axial direction so that each of the yokes 31, 32 is not disassembled.

Next, the functions of the automatic faucet apparatus 3 and the generator 1 will be described.

In the automatic faucet apparatus 3 and generator 1 which are configured as described above, when the user introduces a hand under the water discharging port 6, the introduction is sensed by the sensor 7, and the solenoid valve 8 is opened by the controller 57 to communicate with the water supply channel 10. This causes the water flow to be supplied into the cylindrical body 13 of the generator 1, and the water flows inside the cylindrical body 13 to be discharged from the water discharging port 6. When the user removes the hand from the area under the water discharging port 6, the solenoid valve 8 is closed to automatically stop the water flow.

The water flow flowing into the cylindrical body 13 flows over the surface of the conical member of the pre-rotation stator vane 14 to spread radially outward, and is formed as a swirling flow which swirls in the rightward direction about the axis center, to flow through the stator vane channels 71 between the stator vane blades 18.

The swirling flow which has flown through the stator vane channels 71 enters the rotor vane channels 72, and impinges on the upper inclined faces of the rotor vane blades 19. The swirling flow entering the rotor vane channels 72 is a flow which swirls in the rightward direction about the axis center, and hence a rightward force acts on the rotor vane blades 19, so that the rotor vane 15 is rotated in the rightward direction. The water flow which flows through the rotor vane channels 72 that are inside the inner circumferential face of the magnet M passes through the inside of the bearing 17, and then passes through the inside of the cylindrical body 13 to reach the water discharging port 6.

When the rotor vane 15 is rotated, also the magnet M fixed to the rotor vane 15 is rotated. The outer circumferential face of the magnet M in a radial direction is alternately magnetized with N and S poles along the circumferential direction. When the magnet M is rotated, therefore, the polarities of the inductors 31a, 32a which are opposed to the outer circumferential face of the magnet M, and those of the first and second yokes 31, 32 which are integrated with the inductors are changed. As a result, the directions of interlinking magnetic fluxes with respect to the coil 50 are changed, and an electromotive force is produced in the coil 50, thereby performing electricity generation. The generated power produced by the electricity generation is sent to the charger 56 to be stored thereinto, and then used in the driving of, for example, the solenoid valve 8, the sensor 7, and the controller 57, and the like.

Figure 8:
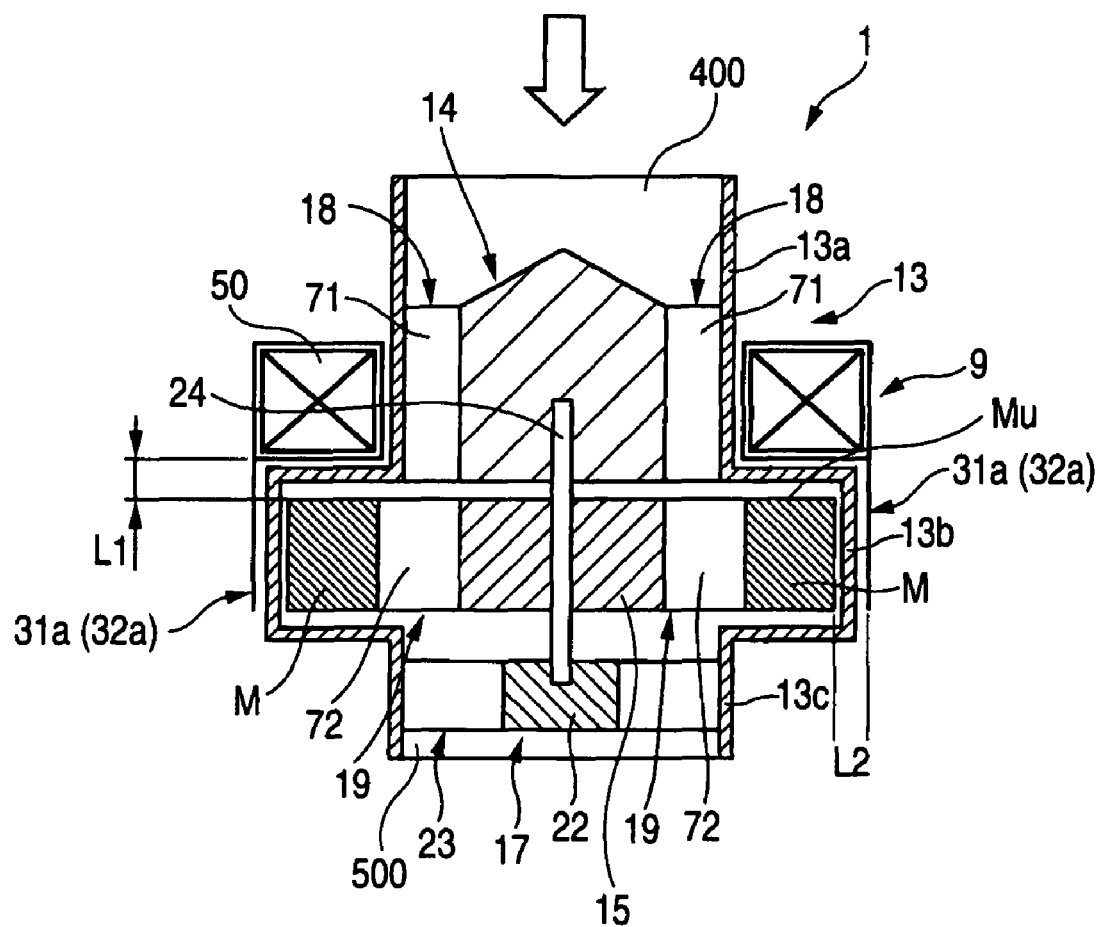
FIG. 8 is a schematic sectional view of a generator of another embodiment.

As shown in FIG. 8, the coil 50 may be placed so as to be opposed to the upstream end face Mu of the magnet M. In this case, parts of the inductors 31a, 32a (the portions of the inductors 31a, 32a which exist in L1 in FIG. 8) are positioned relatively on the upstream side of the magnet M. Therefore, the electromagnetic force acting on the magnet M has a component of pulling the magnet M toward the upstream side. According to the configuration, the load due to the water flow which is received by the bearing 17 can be reduced, and hence the sliding face of rotation can be further suppressed from being worn. Similarly, also the load due to the water flow which is received by the rotor vane 15 and the magnet M is reduced, and hence also the loss of hydro energy for rotating the rotor vane 15 can be suppressed, so that the power generation efficiency of the generator 1 can be improved.

Figure 9A:
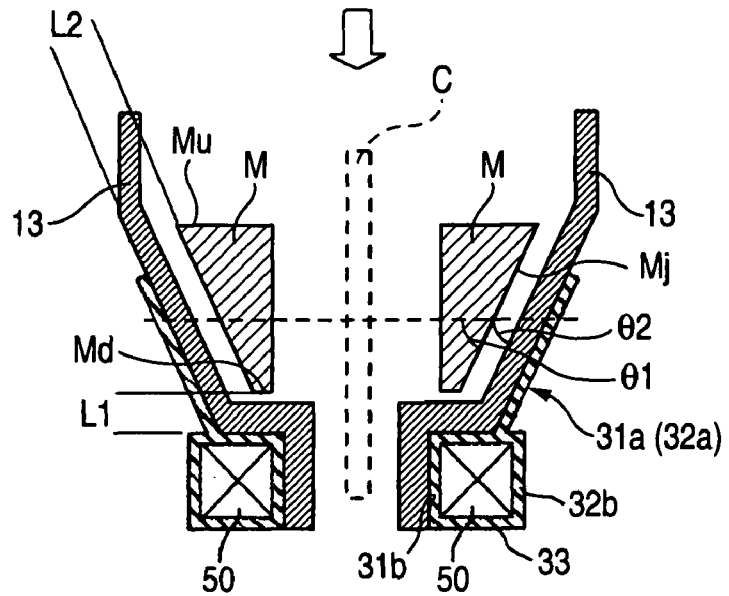
FIGS. 9A and 9B are schematic sectional views of the generator of the other embodiment.
Figure 9B:
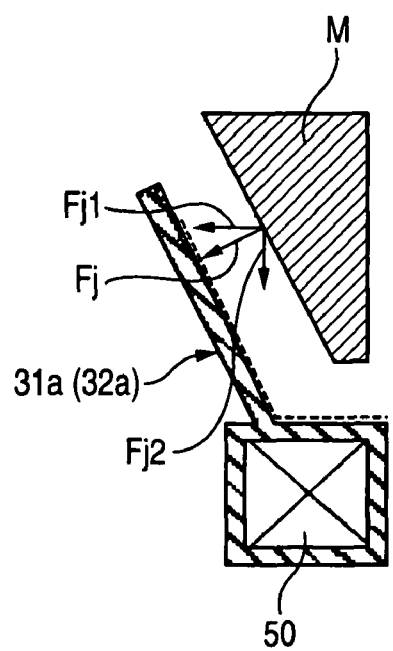

The magnet M and the inductors 31a, 32a may be placed as shown in FIGS. 9A and 9B.

In this case, as shown in FIG. 9A, the magnet M has a truncated conical shape in place of a cylindrical shape. The magnet is magnetized in an outer circumferential face Mj which intersects with a plane perpendicular to the rotation center axis C. In this way, the magnet M is not necessary to have a cylindrical shape. When the magnet M is formed into a truncated conical shape as in this example, the surface area of the outer circumferential face Mj which functions as a magnetized face can be ensured, and the electric-generating capacity can be increased while suppressing the height of the magnet M.

Returning to the description of FIG. 9A, the angle formed by a plane perpendicular to the rotation center axis C and the outer circumferential face Mj is indicated by θ1. The coil 50 is placed to be opposed to the downstream end face Md of the magnet M. The case 13 has a wall face which is formed at an angle of θ2 with respect to the plane perpendicular to the rotation center axis C. The inductors 31a, 32a are formed outside the wall face. In this example, θ1 and θ2 are equal to each other, and the distance L2 between the outer circumferential face Mj of the magnet M and the inductors 31a, 32a is equal in a portion where they are opposed to each other.

Next, with reference to FIG. 9B, the function of the electromagnetic force will be described. An electromagnetic force Fj acting between the magnet M and the inductors 31a, 32a is dispersed into a horizontal component Fj1 and a vertical component Fj2. At this time, the vertical component Fj2 is the electromagnetic force acting on the bearing 17. In this example, the direction in which the electromagnetic force Fj acts is dispersed, whereby the function of the electromagnetic force acting on the bearing 17 is reduced, and the load to the bearing 17 is lessened. When θ1 and θ2 are 45 deg., for example, the electromagnetic force Fj can be equally divided into the horizontal component Fj1 and the vertical component Fj2, and the load which is received by the bearing 17 can be sufficiently reduced.

Figure 10A:
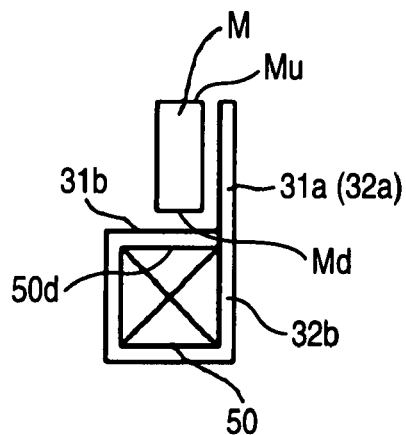
FIGS. 10A to 10C are schematic sectional views illustrating an example of placement of inductors.
Figure 10B:
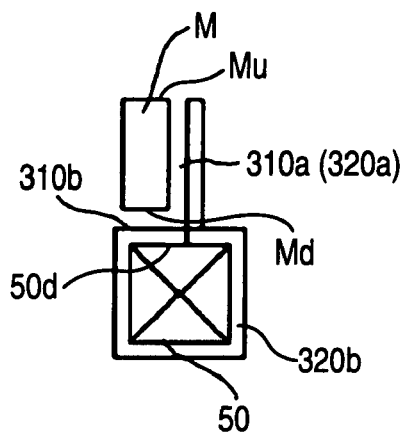
Figure 10C:
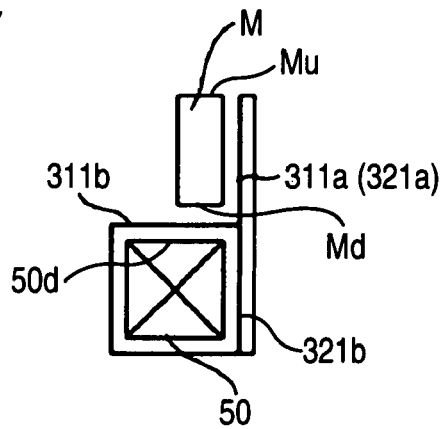

FIGS. 10A to 10C are schematic sectional views illustrating an example of placement of the inductors.

As shown in FIGS. 10A to 10C, the upper end face 50d of the coil 50 is opposed to the downstream end face Md of the magnet M, and the outer circumferential face of the magnet M is opposed to inductors 31a, 32a, 310a, 320a, 311a, 321a. Base parts 31b, 310b, 311b are disposed between the upper end face 50d of the coil 50 and the downstream end face Md of the magnet M. All inductors "extending" from the base parts include the shapes shown in FIGS. 10A to 10C. Namely, all of the inductors 31a, 32a, 310a, 320a, 311a, 321a "extend" from respective base part 31b, 32b, 310b, 320b, 311b, 321b. As shown in FIGS. 10A to 10C, the position of each of the inductors in a radial direction can be adequately selected in a range from the outer circumferential face of the coil 50 to the inner circumferential face.

In any case, preferably, the downstream end face Md of the magnet M exists immediately above the upper end face 50d of the coil 50. When the inductors are placed as shown in FIG. 10A, particularly, there is an advantage that the production of the yoke including the formation of the inductors is facilitated. Moreover, the diameter of the magnet can be made maximum with respect to that of the whole generator, and hence the surface area of the magnet is increased, so that the amount of surface magnetic fluxes can be made large. Since the peripheral speed is increased, also the changing rate of magnetic fluxes is increased, and the electric-generating capacity can be made large.

The position of the tip end face of the inductor which is disposed at a position opposed to the outer circumferential face of the magnet M is requested to be at least above the downstream end face Md of the magnet M. When the electric-generating capacity is considered, however, the tip end face of the inductor is preferably positioned in the vicinity of the upstream end face Mu of the magnet M. For example, the tip end face of the inductor and the upstream end face Mu of the magnet M are at a substantially same position in the axial direction.

FIGS. 10A to 10C show the example in which the coil 50 is placed in the downstream side of the magnet M. A similar design is enabled also in the case where the coil 50 is placed in the upstream side of the magnet M.

Figure 11:
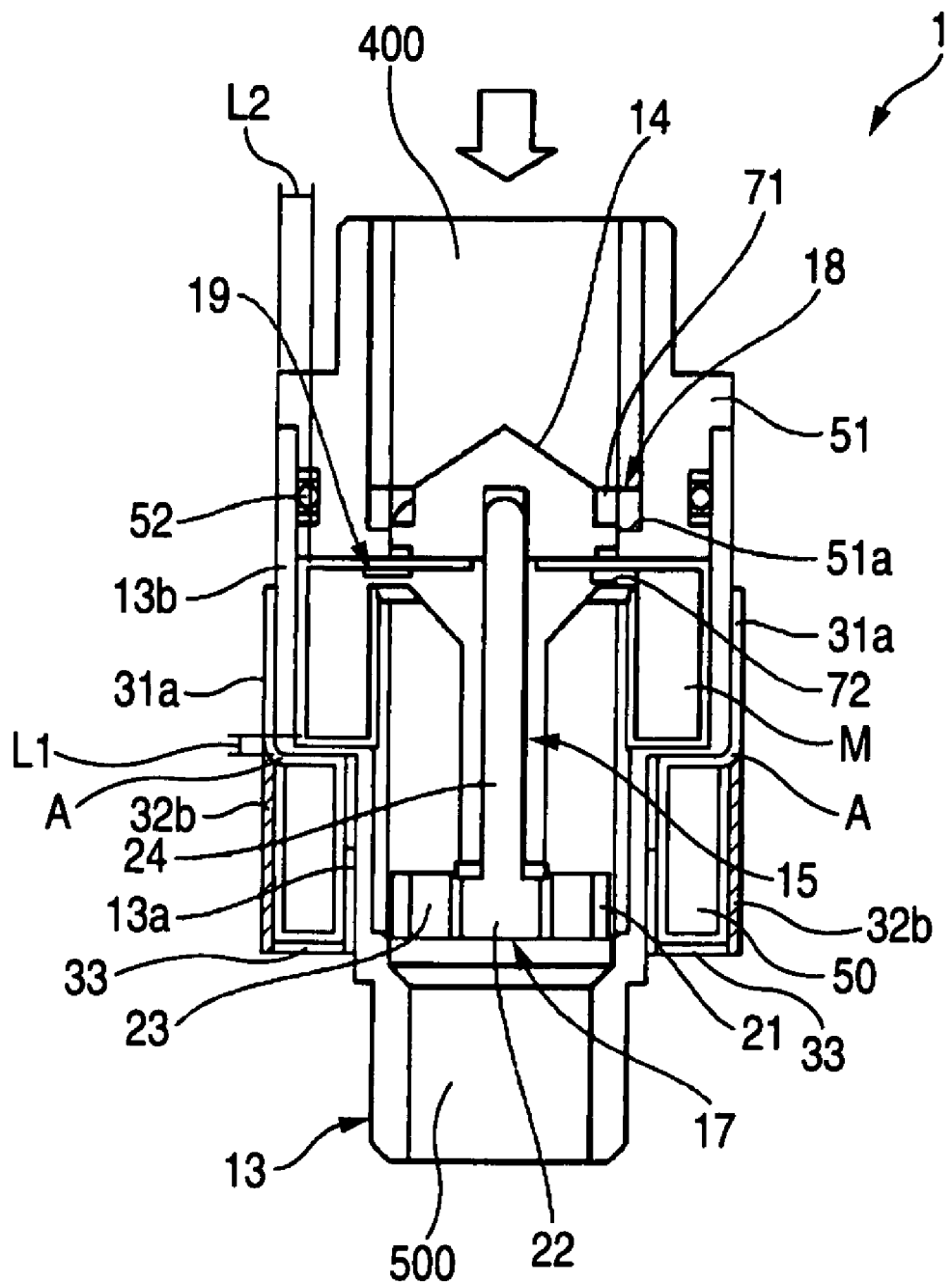
FIG. 11 is a schematic sectional view of a generator of another embodiment.
Figure 12:
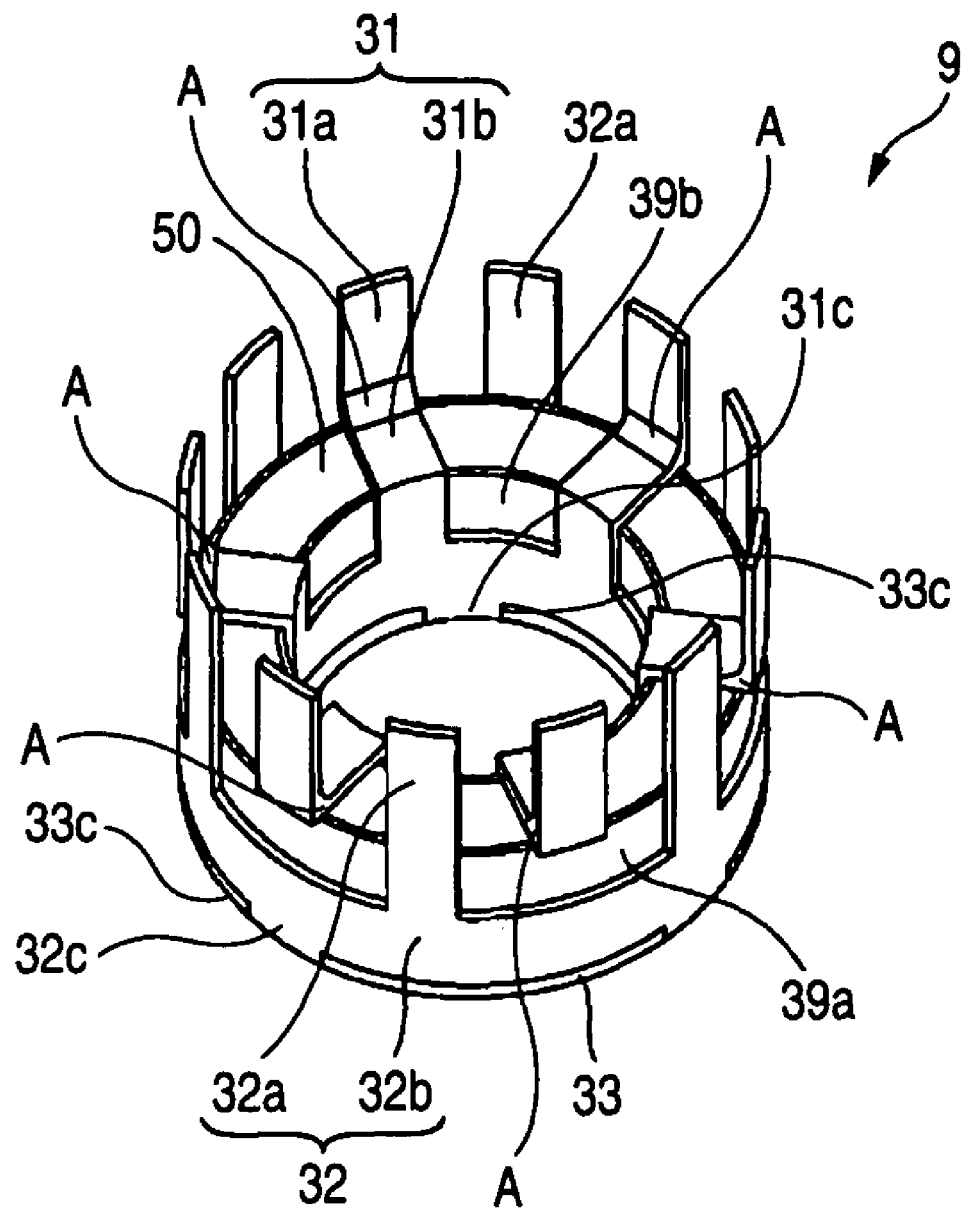
FIG. 12 is a schematic perspective view of a stator of the other embodiment.

As shown in FIGS. 11 and 12, the first yoke 31 may include a bent part A which connects the inductor 31a with the base part 31b. In the case where a yoke having a bent part as the first yoke 31 is to be produced, bending which is performed completely perpendicularly is not preferred, and, when a bent part having a curvature is disposed, the durability of the yoke is improved.

During power generation, the yoke receives the action of the electromagnetic force, and stress concentration occurs depending on the shape. When the bent part A is disposed as in the example, stress concentration is relaxed, and the durability of the yoke is improved. In the case where the inductor 31a is relatively longer than the total length of the stator 9, particularly, the bent part A further enhances the effect of suppressing stress concentration.

Figure 13A:
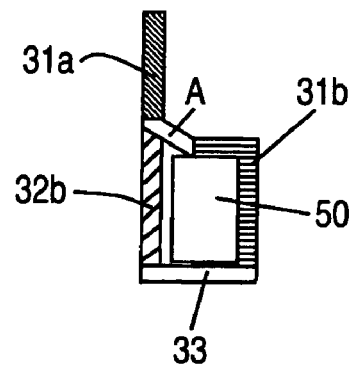
FIGS. 13A to 13C are schematic sectional views illustrating an example of a bent part.
Figure 13B:
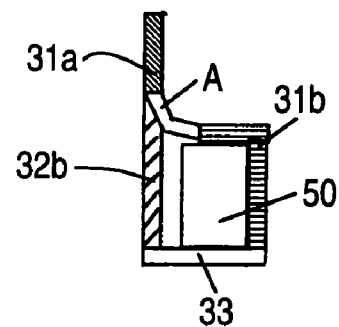
Figure 13C:
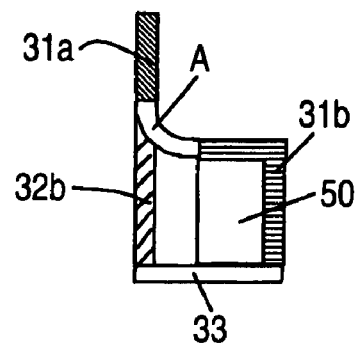

FIGS. 13A to 13C are schematic views illustrating an example of the bent part A. As shown in FIG. 13A, the bent part A may not have a curved surface, and may have a planar shape. As shown in FIG. 13B, the bent part A may have at least one bent part. As shown in FIG. 13C, the bent part A may be formed from a position which does not completely overlap with the coil 50 in the axial direction.

Figure 14A:
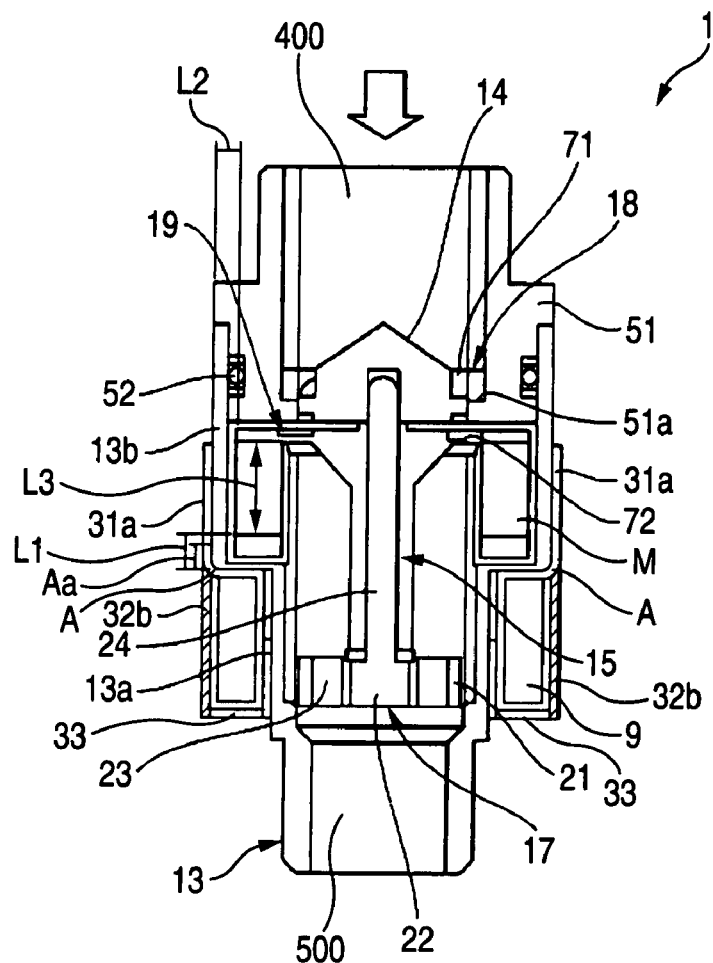
FIG. 14A is a schematic sectional view of a generator of another embodiment.
Figure 14B:
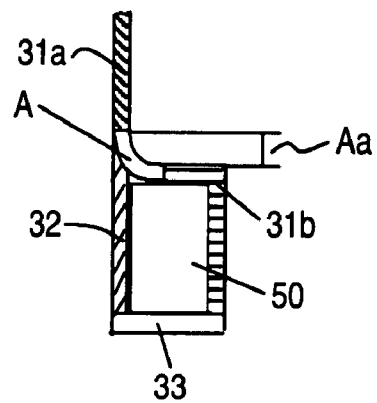
FIG. 14B is a schematic sectional view illustrating in detail a bent part A shown in FIG. 14A.

A magnetic material which is used as the material of the yoke is sometimes formed when the bent shape is formed by press working, into a state where distortion is applied about the bent part A depending on the characteristics of the bent part A of the material. In this case, the magnetic characteristics are impaired, and magnetic fluxes are hardly passed. In the example shown in FIG. 14A, therefore, the magnet M is configured so as not to be opposed to the bent part A. As shown in FIG. 14B, the bent part A is disposed between the inductor 31a and the base part 31b, and the distance Aa exists between the upper end face of the base part 31b and the lower end face of the inductor 31a. The configuration where the magnet M is not opposed to the bent part A means that the distance L1 (see FIG. 14) between the downstream end face of the magnet M and the base part 31b opposed thereto satisfies the relationship of L1≧Aa with respect to the distance Aa. Specifically, it is preferable that the distance Aa is about 0.2 mm to 0.8 mm, and, by contrast, L1 is preferably set to about 1 mm or longer.

In this way, the outer circumferential face of the magnet M is opposed to the inductors 31a, 32a having a straight shape which causes less magnetic distortion, and not opposed to the bent part A where magnetic distortion exerts a large influence.

Even when the yoke is formed by any material, therefore, a stable amount of magnetic fluxes can be always guided to the coil 50, and a stable electric-generating capacity can be obtained.

Figure 15:
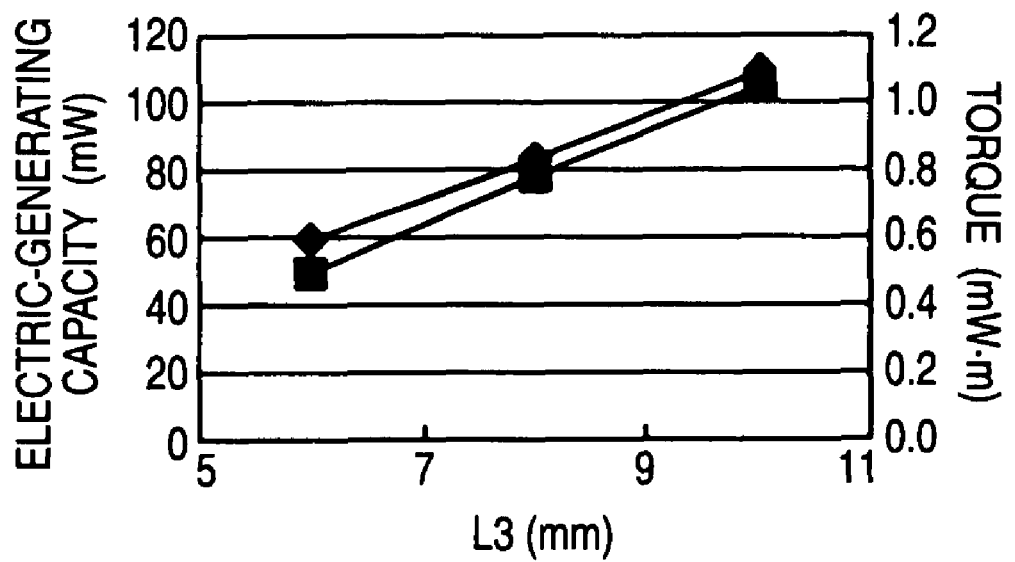
FIG. 15 is a graph chart illustrating relationships between the length of an overlapping portion of the magnet and the inductors, and the electric-generating capacity and the torque.

FIG. 15 is a graph chart illustrating relationships between the length L3 (see FIG. 14A) in which the magnet M is opposed to the inductor having the straight shape, and the electric-generating capacity and the torque. In other words, the length L3 is an axial length in which the magnet M and the inductor having the straight shape overlap with each other in a radial direction. Namely, it means that, as the length L3 is longer, the shapes of the magnet M and the inductor are longer. Furthermore, it is seen that, as the opposing length L3 is longer, both the electric-generating capacity and the torque are more increased proportionally.

When the magnet M is not opposed to the bent part A where magnetic distortion exerts a large influence, but opposed to the inductor having a straight shape which causes less magnetic distortion, the electric-generating capacity and the torque can be controlled not only stably but also by the overlapping length and the opposing area, and a structure which can be easily designed is obtained.

Specifically, when the length L3 is adjusted, it is possible to easily design a generator which is suitable for the use mode of the generator. In the case where the water quantity is large and also the torque is large, and a large electric-generating capacity is required, the length L3 is increased, and, in the case where the water quantity is small and the torque is small, and the electric-generating capacity can be reduced, the length L3 is shortened. An example of the former case is a generator to be disposed in a bathtub faucet, and that of the latter case is a generator to be disposed in a lavatory faucet.

FIG. 16 is a schematic view illustrating relationships between the dimensions of the inductors 31a, 32a and the magnetic sections G of the magnet. It is preferable to configure so that, when the center of the magnetic sections G of the magnet M faces that of the inductors 31a, 32a as shown in FIG. 16, each of the magnetic sections G contains in its region only one of the inductors 31a, 32a. In the case of the example shown in FIG. 16, namely, the magnetic section G facing the inductor 31a does not contain the inductor 32a adjacent to the inductor 31a, but contains the inductor 31a in the region of the magnetic section G. Also in the magnetic section G facing the inductor 32a, a similar situation occurs. In this specification, the center of an inductor means the center of gravity of the inductor. According to the configuration, one inductor is magnetized only to one magnetism (for example, the S pole), and the adjacent other inductor is magnetized only to the other magnetism (for example, the N pole). Therefore, desired interlinking magnetic paths which contribute to electricity generation of the coil 50 can be sufficiently obtained. As a result, when the magnetic poles are changed, the changing rate of magnetic fluxes is increased, and the electric-generating capacity can be made large.

FIG. 16 shows the example where the width W2 of the magnetic section G of the magnet M is larger than the width W1 of the inductors 31a, 32a. Alternatively, the width W1 of the inductors 31a, 32a may be larger than the width W2 of the magnetic section G of the magnet M. When the width W2 of the magnetic section G is larger than the width W1 of the inductors 31a, 32a, however, the surface magnetic flux density of the magnet M can be increased, and hence the electric-generating capacity can be made large. When the electric-generating capacity is considered, preferably, W1:W2=1:2 is approximately set. FIG. 16 schematically shows the case where magnetization is performed in the circumferential direction of the magnet. The same applies also to the case where magnetization is performed in the upstream end face or downstream end face of the magnet.

FIGS. 17A to 17C are schematic views illustrating relationships between the shape of the inductors and that of the magnetic sections of the magnet. FIGS. 17A and 17B show examples where the side face of the inductor is inclined with respect to a direction perpendicular to the rotation direction of the magnet M, and FIG. 17C shows an example where the boundary of the magnetic sections is inclined with respect to a direction perpendicular to the rotation direction of the magnet M. The arrows in the figures indicate the rotation direction of the magnet M.

It is preferable that, in accordance with rotation of the magnet M, the area of a region where the magnetic section of the magnet M faces the inductor is gradually increased or decreased. According to the configuration, the attracting and repelling forces acting between the magnet M and the yoke can be suppressed from being rapidly changed, and hence cogging is suppressed to enable the magnet to be smoothly rotated. As a result, shaft friction and torque loss can be suppressed, and the electric-generating capacity can be increased. FIGS. 17A to 17C show the examples in which the side face of the inductor or the boundary of the magnetic sections is linearly changed. However, the manner of the change is not restricted to them. The change may be performed in a shape of an arbitrary curve, or a combination of curve and straight lines.

FIGS. 18 to 24 are schematic views illustrating coupling portions of the first yoke 31, the second yoke 32, and the third yoke 33. FIGS. 18 to 24 show a magnetic flux flow a which is formed in the first yoke 31, the second yoke 32, and the third yoke 33 that is coupled to the yokes.

When a gap is formed between the yokes in which a flow of magnetic fluxes interlinking with the coil 50 is formed, a loss of the magnetic fluxes occurs, and the electric-generating capacity is reduced. Therefore, members for the yokes are preferably caused to butt against each other through a plurality of faces, so that, even when a gap is formed in a part of the faces during assembling or the like, the magnetic path can be ensured through the other faces, whereby the reduction of the electric-generating capacity can be suppressed.

Figure 18:
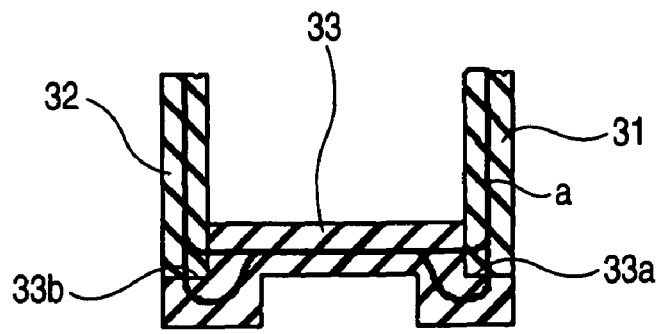
FIGS. 18 to 24 are schematic views showing an example of couplings of first, second, and third yokes.

In the example shown in FIG. 18, a lower end portion of the first yoke 31 is engaged with an inner-circumference step portion 33a of the third yoke 33, so that the first yoke 31 and the third yoke 33 butt against each other through a plurality of faces (in the example, two faces which are substantially perpendicular to each other) which are formed into a substantially annular form along the circumferential direction of the coil 50. The lower end face of the first yoke 31 butts against a flange-like face which is projected toward the coil center in the inner-circumference step portion 33a of the third yoke 33, and the outer side face (the face which is opposite in the coil center direction, and which is substantially perpendicular to the lower end face) of the lower end portion of the first yoke 31 butts against the side face which is substantially perpendicular to the flange-like face in the inner-circumference step portion 33a of the third yoke 33.

Similarly, a lower end portion of the second yoke 32 is engaged with an outer-circumference step portion 33b of the third yoke 33, so that the second yoke 32 and the third yoke 33 butt against each other through a plurality of faces (in the example, two faces which are substantially perpendicular to each other). The lower end face of the second yoke 32 butts against a flange-like face which is projected in a direction opposite to the coil center direction, and the side face (the face which is substantially perpendicular to the lower end face) in the coil center direction in the lower end portion of the second yoke 32 butts against the side face which is substantially perpendicular to the flange-like face in the outer-circumference step portion 33b of the third yoke 33.

Figure 19:
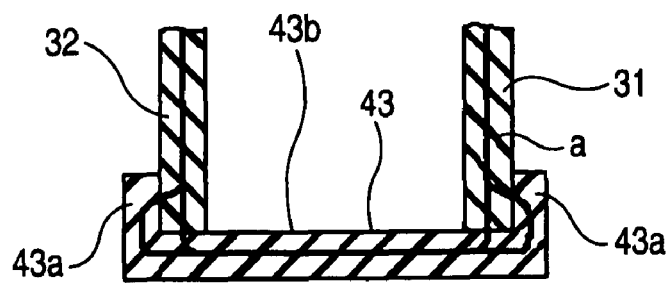

In the example shown in FIG. 19, a third yoke 43 has projected portions 43a which are projected from the inner and outer circumferential edges of the yoke. The lower end faces of the first yoke 31 and the second yoke 32 butt against two faces which are formed by the projected portions 43a and a face 43b of the third yoke 43, and which are substantially perpendicular to each other. Also in this example, the first yoke 31 and the second yoke 32 can butt against the third yoke 43 through a plurality of faces. Therefore, a loss of the magnetic fluxes can be suppressed between the first yoke 31 and the second yoke 32, and the third yoke 33, and the reduction of the electric-generating capacity can be suppressed.

Figure 20:
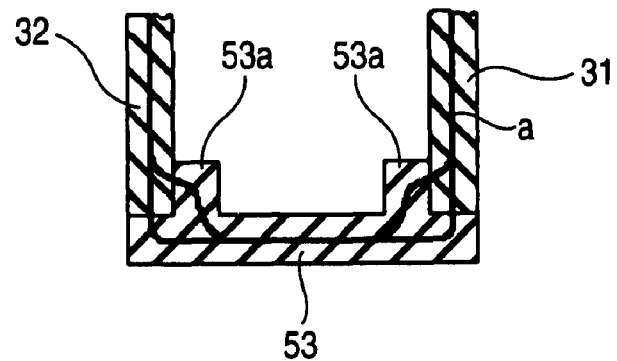

In the example shown in FIG. 20, a third yoke 53 has rib-like convex portions 53a in each of the inner and outer circumferential sides of the yoke, so that two faces which are substantially perpendicular to each other are disposed. The first yoke 31 and the second yoke 32 butt against the two faces, respectively. Also in this example, the first yoke 31 and the second yoke 32 can butt against the third yoke 53 through a plurality of faces. Therefore, a loss of the magnetic fluxes can be suppressed between the first yoke 31 and the second yoke 32, and the third yoke 53, and the reduction of the electric-generating capacity can be suppressed.

Figure 21:
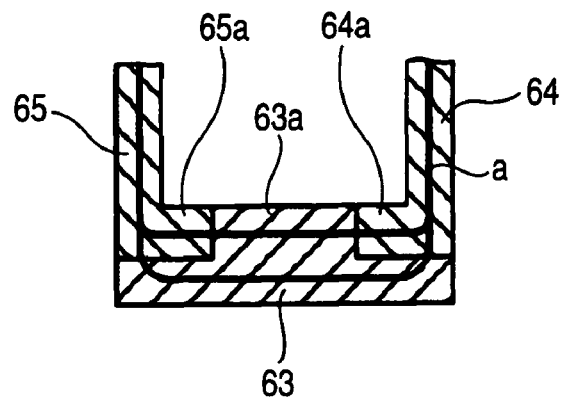

In the example shown in FIG. 21, a convex portion 63a is disposed at the middle of a radial direction (in FIG. 21, the lateral direction) in a third yoke 63, so that two faces which are substantially perpendicular to each other are disposed in the third yoke 63. Lower end portions 64a, 65a of a first yoke 64 and a second yoke 65 are formed into an L-like section shape. The lower end portions 64a, 65a are engaged to the sides of the convex portion 63a of the third yoke 63, whereby the first yoke 64 and the second yoke 65 are caused to butt against the third yoke 63 through a plurality of faces, respectively. According to the configuration, also in this example, a loss of the magnetic fluxes can be suppressed between the first yoke 64 and the second yoke 65, and the third yoke 63, and the reduction of the electric-generating capacity can be suppressed.

Figure 22:
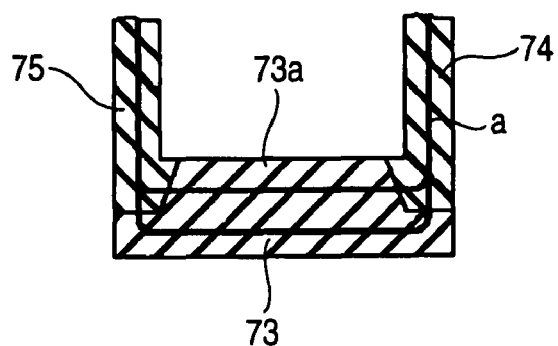

In the example shown in FIG. 22, a convex portion 73a having a trapezoidal section shape is disposed at the middle of a radial direction (in FIG. 22, the lateral direction) in a third yoke 73, so that two faces which form an obtuse angle is disposed in the third yoke 73. Lower end portions of a first yoke 74 and a second yoke 75 are engaged with the sides of the convex portion 73a of the third yoke 73, whereby the first yoke 74 and the second yoke 75 are caused to butt against the third yoke 73 through a plurality of faces, respectively. According to the configuration, also in this example, a loss of the magnetic fluxes can be suppressed between the first yoke 74 and the second yoke 75, and the third yoke 73, and the reduction of the electric-generating capacity can be suppressed.

Figure 23:
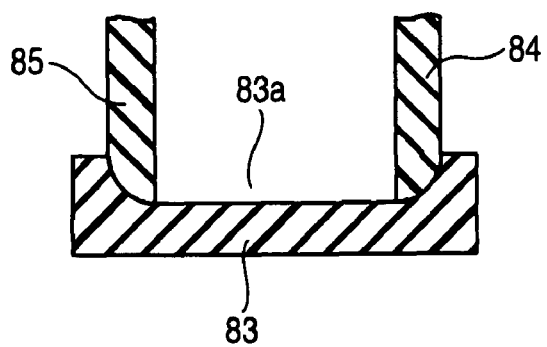

In the example shown in FIG. 23, a substantially annular recess 83a in which the inner wall face is formed into a curved shape, and which extends along the circumferential direction of the coil 50 is formed in a third yoke 83, and a substantially annular curved portion which extends along the inner wall face of the recess 83a is disposed in a lower end portion of each of a first yoke 84 and a second yoke 85. The curved portions of the first yoke 84 and the second yoke 85 butt against the inner wall face of the recess 83a of the third yoke 83.

In this case, each of the first yoke 84 and the second yoke 85 butts against the third yoke 83 through the curved face. Even when a relative positional displacement occurs between the first yoke 84 and the second yoke 85, and the third yoke 83 to form a gap, a state where the first yoke 84 and the second yoke 85 are completely non-contacted with the third yoke 83 hardly occurs. Therefore, a loss of the magnetic fluxes formed between the yokes can be suppressed, and the reduction of the electric-generating capacity can be suppressed.

Figure 24:
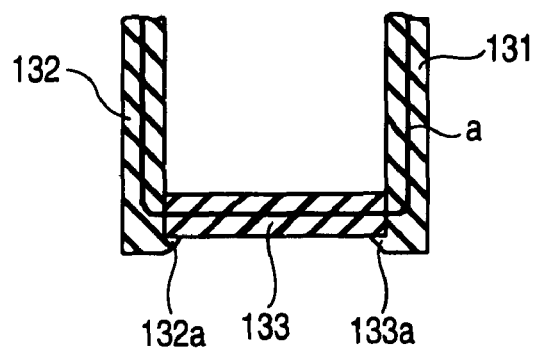

In the example shown in FIG. 24, each of a first yoke 131 and a second yoke 132 butts against a third yoke 133 through one face, and the lower end faces of the first yoke 131 and the second yoke 132 are crimped, so that butting through a plurality of faces including crimped portions 132a, 133a is performed. According to the configuration, also in this example, a loss of the magnetic fluxes can be suppressed between the first yoke 131 and the second yoke 132, and the third yoke 133, and the reduction of the electric-generating capacity can be suppressed.

Preferably, a material having excellent magnetization characteristics is selected as the material of the yokes. Specifically, for example, a magnetic material such as pure iron, permalloy, sendust alloy, silicon steel, or electromagnetic stainless steel can be used as the material of the yokes. However, the material of the yokes is not restricted to these materials, and may be adequately changed. In the case of a small generator, preferably, electromagnetic stainless steel, permalloy, or silicon steel may be used as the material of the yokes.

In the case where a yoke is configured by coupling plural portions, the portions may be formed by different materials. For example, a portion containing an inductor where magnetic fluxes are most concentrated may be formed by a material having highest magnetization characteristics. Usually, there is a tendency that a material having higher magnetization characteristics is more expensive. Therefore, an expensive material may be used only in a much-needed portion, so that the total cost is suppressed. Alternatively, materials having different magnetization characteristics may be combined to adjust the magnetization characteristics of the whole yoke, thereby restricting the electric-generating capacity.

In order to miniaturize the generator 1, the miniaturization of the coil 50 is an important factor. When the generator 1 is miniaturized, also the winding space for the coil 50 is reduced, and hence the number of turns of the coil 50 is reduced, so that the electric-generating capacity is reduced. When the wire diameter of the coil 50 is reduced in order to increase the number of turns, the internal resistance of the coil 50 is increased, and hence the heat loss is raised, so that the electric-generating capacity is still reduced.

Usually, a coil is formed by winding a wire around a cylindrical insulative member which is called a bobbin. In this case, the bobbin has a thickness of about 0.5 mm to 1 mm. In a small generator to be disposed in a faucet apparatus, also such a space affects the electric-generating capacity.

In the first embodiment, therefore, an insulating layer is disposed on a portion of a yoke which is contacted with the coil 50, and an insulative member such as a bobbin is made unnecessary. Therefore, a space for the winding of the coil 50 can be ensured, the wire diameter can be increased, and also the number of turns can be increased. As a result, the electric-generating capacity can be increased.

Specifically, in the coil 50 having an inner diameter of 14 mm and an outer diameter of 22 mm, an insulation process is applied on the inner face of a yoke which is to be contacted with the coil 50, so that the necessity of an insulative member such as a bobbin is eliminated, whereby the space for the winding of the generator 1 can be increased by about 70%. An example of the insulation process is coating of a fluorine resin having a thickness several tens of μM. The material, thickness, coating method, and the like which are used in the insulation process are not restricted to this, and may be adequately changed.

Hereinafter, a second embodiment of the invention will be described with reference to FIGS. 25 to 31. In the drawings, identical components are denoted by the same reference numerals.

The second embodiment of the invention provides a faucet generator wherein the generator includes: a rotor vane which has a rotation center that is substantially parallel to a water supply channel, and which is disposed in the water supply channel to be rotatable about the rotation center; a magnet which is disposed to surround the rotor vane, and which is rotatable integrally with the rotor vane; a stator which is disposed to be opposed to an axial end face of the magnet, and which has a yoke and an inductor; a coil which is disposed in the stator, and in which an electromotive force is produced by rotation of the magnet; and a shaft supporting portion which supports, in an axial direction, a center shaft that is substantially parallel to the water supply channel, an outer circumferential face of the magnet is magnetized, the inductor is disposed to be opposed to the outer circumferential face of the magnet, and a part of the inductor is positioned on an upstream axial end face of the magnet.

According to the second embodiment of the invention, a faucet generator in which a force acting on a portion supporting a rotary member can be suppressed is provided.

Figure 25:
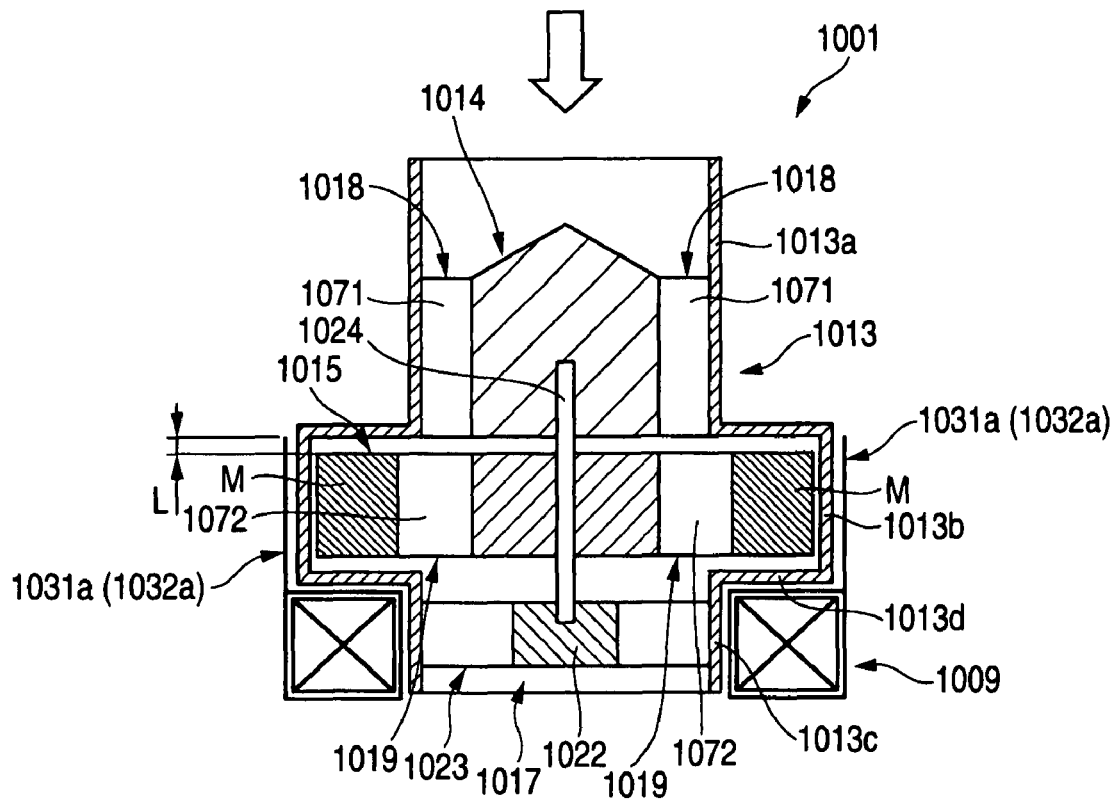
FIG. 25 is a schematic sectional view of a generator of a second embodiment of the invention.

FIG. 25 is a schematic sectional view of a generator 1001 of the second embodiment of the invention.

Figure 26A:
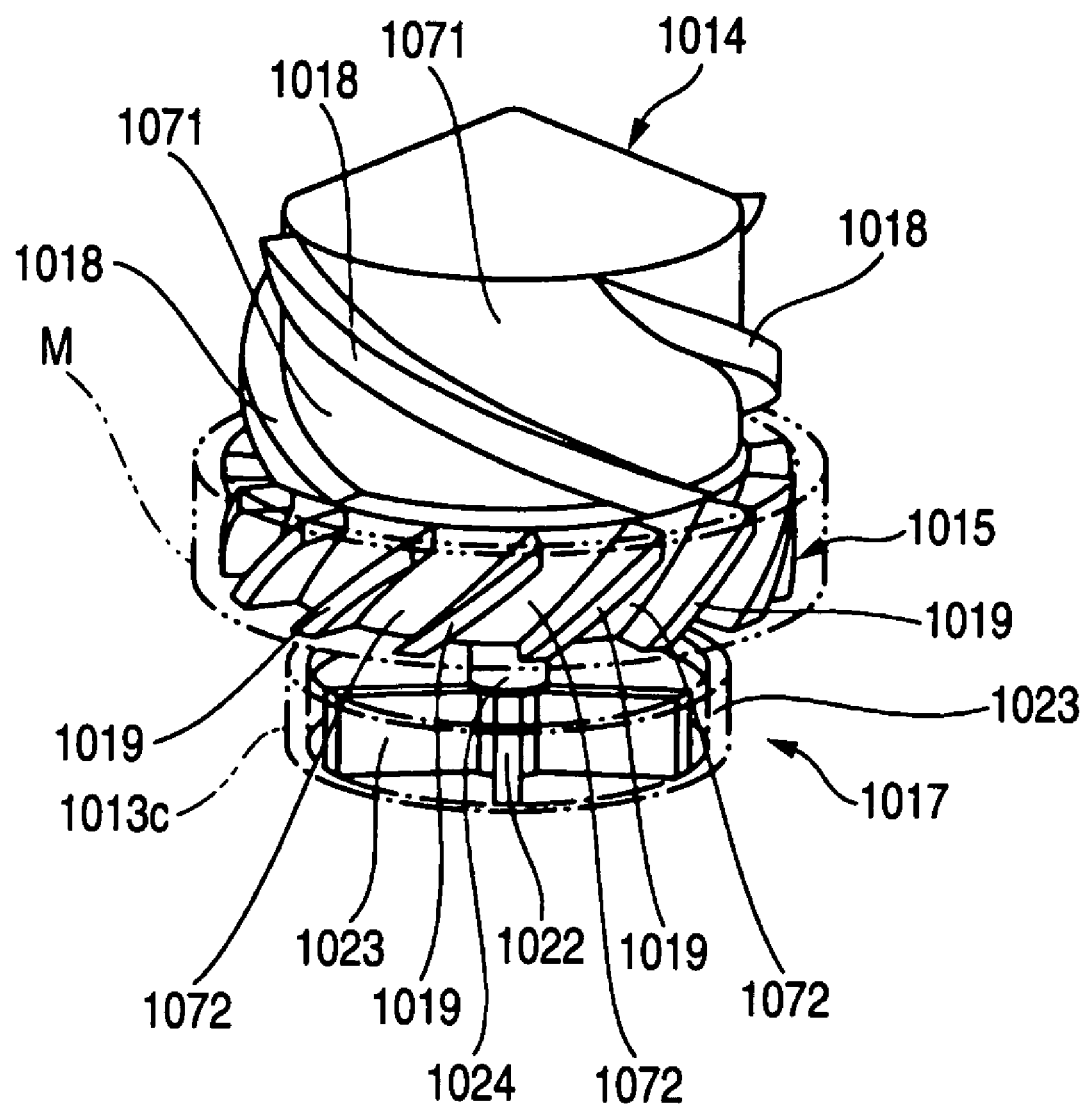
FIGS. 26A and 26b are schematic perspective views of a pre-rotation stator vane, a rotor vane, and a bearing in the generator of FIG. 25.
Figure 26B:
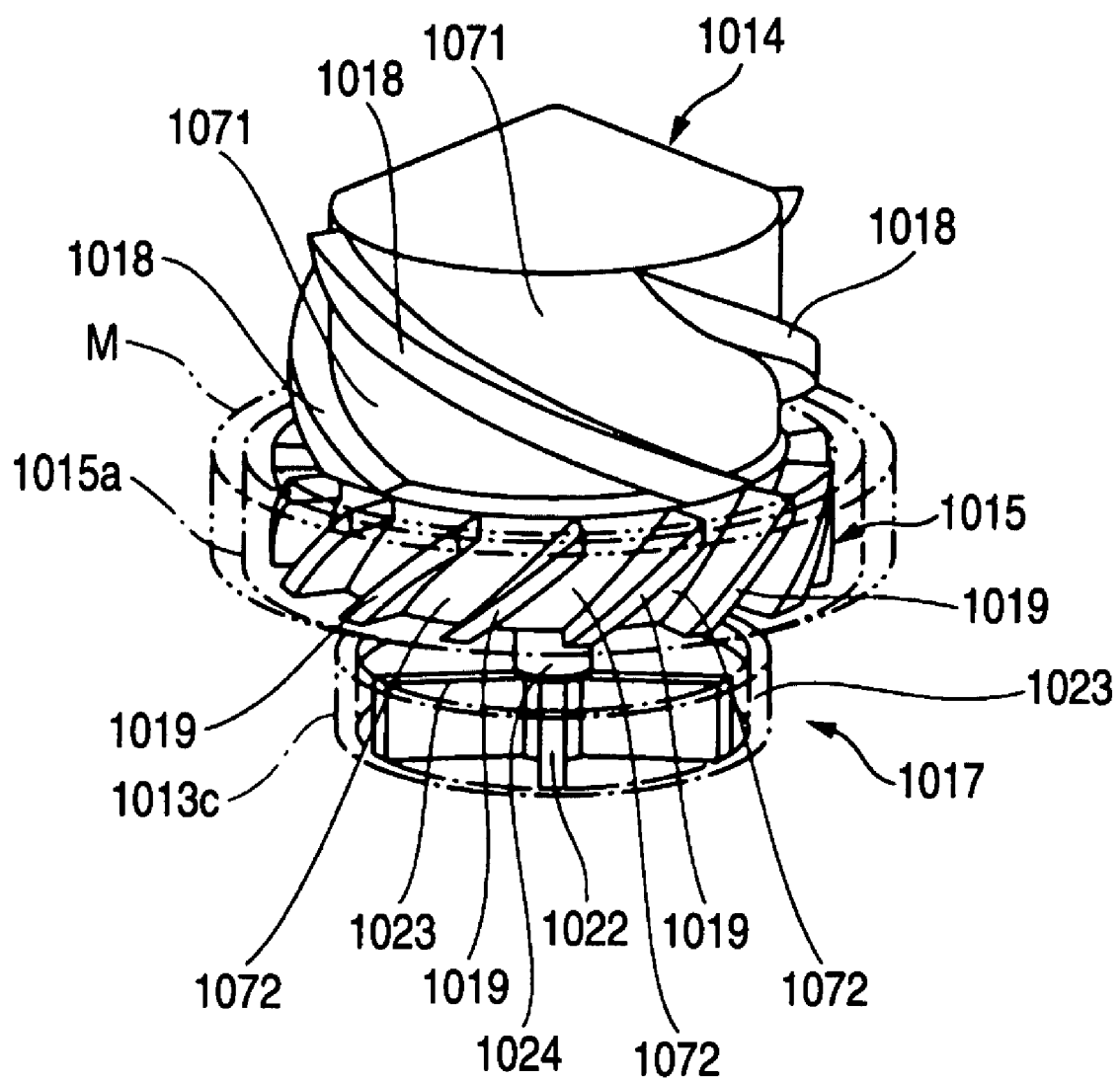

FIG. 26 is a schematic perspective view of a pre-rotation stator vane 1014, rotor vane 1015, and bearing 1017 of the generator 1001. FIG. 26A exemplarily shows a case where a rotor vane ring 1015a is not disposed, and FIG. 26B a case where the rotor vane ring 1015a is disposed.

As shown in FIG. 25, the generator 1001 includes a cylindrical body 1013, the pre-rotation stator vane 1014, the rotor vane 1015, the magnet M, and a stator 1009. These components are housed in the case 12 (see FIG. 3). The arrow which is drawn above the pre-rotation stator vane 1014 indicates the direction of the water flow.

The cylindrical body 1013 has a stepped shape consisting of a first small-diameter portion 1013a, a large-diameter portion 1013b, and a second small-diameter portion 1013c, and is disposed in the water discharger 3b which is shown in FIGS. 2 and 3, in a state where the interior of the cylindrical body communicates with the water supply channel. In this case, the cylindrical body is disposed in such a manner that the center axis direction of the cylindrical body 1013 is substantially parallel to the direction of the water flow, the first small-diameter portion 1013a is directed toward the upstream side, and the second small-diameter portion 1013c is directed toward the downstream side.

In the cylindrical body 1013, in the sequence starting from the upstream side, the pre-rotation stator vane 1014, the rotor vane 1015, and the bearing 1017 are disposed. The pre-rotation stator vane 1014 is disposed inside the first small-diameter portion 1013a, the rotor vane 1015 is disposed inside the large-diameter portion 1013b, and the bearing 1017 is disposed inside the second small-diameter portion 1013c.

The pre-rotation stator vane 1014 has a shape in which a conical member is disposed integrally on one end face (the face positioned on the upstream side) of a columnar member. A plurality of projective stator vane blades 1018 which are projected in a radially outward direction are disposed on the circumferential face of the pre-rotation stator vane 1014. The stator vane blades 1018 are inclined from the upstream side toward the downstream side while being twisted in the rightward direction about the axis center of the pre-rotation stator vane 1014. Each space which is between the stator vane blades 1018 that are adjacent to each other in the circumferential direction functions as a stator vane channel 1071. The pre-rotation stator vane 1014 is fixed to the cylindrical body 1013, and is not rotated.

The rotor vane 1015 is disposed on the downstream side of the pre-rotation stator vane 1014. The rotor vane 1015 has a columnar shape, and a plurality of projective rotor vane blades 1019 which are projected in a radially outward direction are disposed on the circumferential face of the rotor vane. Contrary to the stator vane blades 1018, the rotor vane blades 1019 are inclined from the upstream side toward the downstream side while being twisted in the leftward direction about the axis center. Each space which is between adjacent ones of the rotor vane blades 1019 that are adjacent to each other in the circumferential direction functions as a rotor vane channel 1072.

The bearing 1017 includes: a columnar shaft supporting portion 1022 which is disposed at a center portion; and a plurality of coupling members 1023 which are disposed to be projected in a radially outward direction of the shaft supporting portion 1022. The coupling members 1023 are radiately disposed, and the gaps between the coupling members 1023 are not closed, and are passed through the bearing. Therefore, the water flow inside the cylindrical body 1013 is not disturbed. The side end faces of the coupling members 1023 on the radially outer side are fixed to the inner circumferential face of the second small-diameter portion 1013*c*.

A center shaft 1024 which is fixed to the axis center of the rotor vane 1015 is rotatably supported on the shaft supporting portion 1022 of the bearing 1017. Another tip end portion of the center shaft 1024 is projected from the rotor vane 1015 toward the upstream side, and supported so as to be fitted into the pre-rotation stator vane 1014. The tip end portion of the center shaft 1024 and the pre-rotation stator vane 1014 are not fixed to each other, and the center shaft 1024 is rotatable with respect to the pre-rotation stator vane 1014. Alternatively, a configuration may be formed in which the both end portions of the center shaft 1024 are fixed to the shaft supporting portion 1022 and the pre-rotation stator vane 1014, respectively, and the rotor vane 1015 is rotatably fitted to the center shaft 1024.

Namely, the rotor vane 1015 having the rotor vane blades is configured to have a rotation center which is substantially parallel to the water supply channel, and to be disposed in the water supply channel to be rotatable about the rotation center.

In the large-diameter portion 1013*b* of the cylindrical body 1013, the annular magnet M which is fixed to outer circumferential portions of the rotor vane blades 1019 is housed so as to surround the rotor vane channels 1072. Outside the second small-diameter portion 1013*c* of the cylindrical body 1013, disposed is a coil 1050 which is disposed in the stator 1009 that will be described later, so as to be opposed to the axial end face which is on the downstream side of the magnet M.

The inner circumferential face of the magnet M which is indicated by the dash-dot-dot line in FIG. 26A is fixed to radially outward side end faces of the rotor vane blades 1019.

The inner circumferential face of the rotor vane ring 1015*a* which is indicated by the dash-dot line in FIG. 26B is fixed to radially outward side end faces of the rotor vane blades 1019, and the inner circumferential face of the magnet M indicated by the dash-dot-dash line is fixed to the outer circumferential face of the rotor vane ring 1015*a*. The rotor vane ring 1015*a* is not always required. In the case where the ring is disposed, however, the rotor vane 1015 and the magnet M can be more firmly integrated with each other.

The water flow which is disposed to spread toward the outside because of the formation of a swirling flow can be guided by the inner circumferential face of the rotor vane ring 1015*a*, or by, in the case where the rotor vane ring 1015*a* is not provided, the inner circumferential face of the magnet M. Therefore, the wasted hydro energy can be reduced, and the energy conversion can be efficiently performed.

The second embodiment of the invention has the structure ("axial arrangement") where the stator 1009 is opposed to the axial end face of the magnet M. Therefore, the radial dimension can be reduced as compared with the case where the stator 1009 is opposed to the radially outside of the magnet M ("radial arrangement"). Furthermore, the radial dimension of the rotor vane 1015 can be increased by a degree corresponding to the configuration in which the stator 1009 is not disposed radially outside the rotor vane 1015, so that the electric-generating capacity can be increased.

In the case where the cylindrical body 1013 is formed by a material having a low electrical conductivity, such as a resin, the eddy current loss can be reduced as compared with the case where the cylindrical body is formed by a metal, and hence the electric-generating capacity can be further increased. In this case, only the large-diameter portion 1013*b* through which magnetic fluxes are passed may be formed by a material having a low electrical conductivity, such as a resin.

Next, the magnet M and the stator 1009 will be described.

A schematic perspective view of the magnet M is as shown in FIG. 4.

Figure 27:
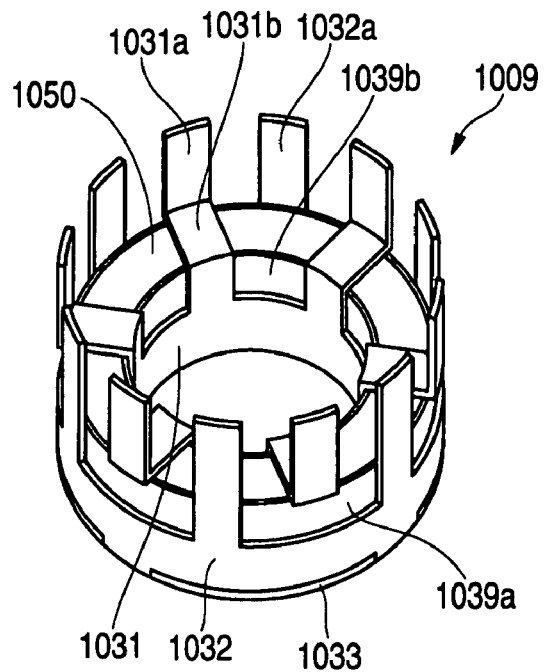
FIG. 27 is a schematic perspective view of a stator.

FIG. 27 is a schematic perspective view illustrating the stator 1009.

As shown in FIG. 4, the radially outward end face (outer circumferential face) of the magnet M is alternately magnetized with N and S poles along the circumferential direction.

As shown in FIG. 27, the stator 1009 has: a first yoke 1031 and second yoke 1032 all of which are made of a soft magnetic material (for example, rolled steel); yokes 1031*b* and inductors 1031*a*, 1032*a* which are continuously contacted with the yokes; and the coil 1050 which is placed in a space surrounded by the first yoke 1031, the second yoke 1032, the yokes 1031*b*, and the inductors 1031*a*, 1032*a*.

In the coil 1050 which is annularly wound, the inner circumferential face, the outer circumferential face, and the both axial end faces are surrounded by the first yoke 1031, the second yoke 1032, and a third yoke 1033.

The first yoke 1031 has a substantially annular shape, and is placed so as to surround the inner circumferential face of the coil 1050. The plurality of yokes 1031*b* are integrally disposed toward the radially outer side, in one axial direction end portion of the yoke. In the first yoke 1031, a portion which is opposed to the inner circumferential face of the coil 1050 is substantially perpendicular to the yokes 1031*b*. The yokes 1031*b* are placed at regular intervals along the circumferential direction of the coil 1050. One ends of the yokes 1031*b* further extend in the axial direction of the coil 1050 to form the inductors 1031*a*.

The second yoke 1032 has a substantially annular shape, and is placed so as to surround the outer circumferential face portion of the coil 1050. The plurality of inductors 1032*a* are integrally disposed in the axial direction, in one axial direction end portion of the yoke. The inductors 1032*a* are placed at regular intervals along the circumferential direction of the coil 1050, and between the inductors 1031*a* of the first yoke 1031. Namely, the inductors 1031*a* of the first yoke 1031, and the inductors 1032*a* of the second yoke 1032 are arranged alternately and separately in the circumferential direction of the coil 1050. The inductors 1031*a*, 1032*a* are disposed immediately above a portion (the second yoke 1032) which is placed so as to surround an outer circumferential face of the coil 1050. The distances from the center of the coil 1050 to the inductors 1031a, 1032a are approximately equal to each other.

The inductors 1031a, 1032a are disposed so as to extend in the axial direction. The inner circumferential faces (the faces on the side located in the center direction of the coil 1050) of the inductors are opposed to the outer circumferential face (the face in a radially outward direction) of the magnet M. The yokes 1031b are opposed to one end face of the coil 1050. The one end face of the coil 1050 is opposed to the axial end face of the magnet M across the yokes 1031b and a flange portion 1013d of the cylindrical body 1013.

The third yoke 1033 has a ring plate-like shape, and is disposed to be opposed to the other end face of the coil 1050. A part of the outer circumferential side of the third yoke 1033 is cut away so that a coil wiring takeout portion which is not shown is formed.

The third yoke 1033 is coupled to end portions of the first yoke 1031 and the second yoke 1032 which are opposite to the end portions where the respective inductors 1032a, 1031b are disposed. The coil 1050 is housed in a space surrounded by the first yoke 1031 to the third yoke 1033. Wirings from the coil 1050 are drawn-out from the coil wiring takeout portion which is formed in the outer circumferential side of the third yoke 1033, and which is not shown, to the outside. In this way, the wirings of the coil 1050 are drawn out from the outer circumferential side to the outside through the coil wiring takeout portion which is formed in the outer circumferential side of the third yoke 1033, and which is not shown. As compared with the case where the wirings are drawn out from the inner circumferential side, therefore, the wirings to the controller 57 are laid easily.

For example, concave-like positioning portions are disposed in the third yoke 1033. When the positioning portions are engaged with convex-like cutout portions formed in the first yoke 1031 and the second yoke 1032, the first yoke 1031 and the second yoke 1032 are positioned at predetermined positions in the circumferential direction, respectively. According to the configuration, the pitch accuracy between the inductors 1031a, 1032a can be improved. Alternatively, convex-like cutout portions may be disposed in the third yoke 1033, and concave-like positioning portions may be disposed in the first yoke 1031 and the second yoke 1032.

Cutout portions 1039a are disposed in the second yoke 1032, and cutout portions 1039b are disposed in the first yoke 1031. In this way, in the yokes 1032, 1031, the cutout portions 1039a, 1039b which are formed by cutting away portions between adjacent inductors from the one end sides where the inductors 1031a, 1032a are disposed are intermittently disposed in the portion which is disposed so as to surround the circumferential face portion of the coil, whereby the yokes 1032, 1031 are magnetically insulated from each other in the circumferential direction. In the magnetic path which is formed along the circumferential faces of the yokes 1032, 1031, portions which are not required for electricity generation are cut away, so that the iron loss can be suppressed and the electric-generating capacity can be increased.

When the dimension in a radial direction (a direction perpendicular to the axial direction) of the generator 1001 is to be reduced, also the dimension in a radial direction of the magnet M must be reduced. Also in this case, however, the axial dimension of the magnet M is not required to be reduced, and, in some cases, can be increased.

In the second embodiment of the invention, the inductors 1031a, 1032a are disposed to be opposed to the outer circumferential face of the magnet M. Therefore, the magnetic fluxes from the outer circumferential face of the magnet M can be guided to the coil 1050 through the inductors 1031a, 1032a. Even in the case where the dimension in a radial direction (a direction perpendicular to the axial direction) is reduced, the influence can be reduced, and a predetermined electric-generating capacity can be ensured.

When the radial direction dimension of the generator 1001 can be reduced while ensuring the electric-generating capacity, for example, also the dimensions of the automatic faucet apparatus 3 in which the generator 1001 is disposed can be reduced. As a result, the installation property, operability, and the like of the automatic faucet apparatus 3 can be improved. Furthermore, the tolerability of employment of an appearance design of the automatic faucet apparatus 3 can be improved. For example, a modern design which is slenderer than the conventional one can be employed.

Since the magnetic fluxes from the outer circumferential face of the magnet M are received by the inductors 1031a, 1032a, the magnetic attracting force acting between the magnet M and the inductors 1031a, 1032a acts in a radial direction of the magnet M. Therefore, the force acting on the rotor vane in the axial direction is mainly configured by the urging force due to the water flow. As a result, the force of pressing the center shaft 1024 which is fixed to the axis center of the rotor vane 1015, against the shaft supporting portion 1022 can be reduced, and hence wear of the sliding portion can be suppressed.

When parts of the inductors 1031a, 1032a are positioned on the upstream side of the upstream axial end face of the magnet M, the magnetic attracting force acts also on between the portions and the magnet M. Therefore, the magnet M can be pulled toward the upstream side, and the force of pressing the center shaft 1024 against the shaft supporting portion 1022 can be further reduced.

As shown in FIG. 1, for example, the tip ends of the inductors 1031a, 1032a are projected so as to be positioned on the upstream side of the upstream end face of the magnet M.

Figure 28:
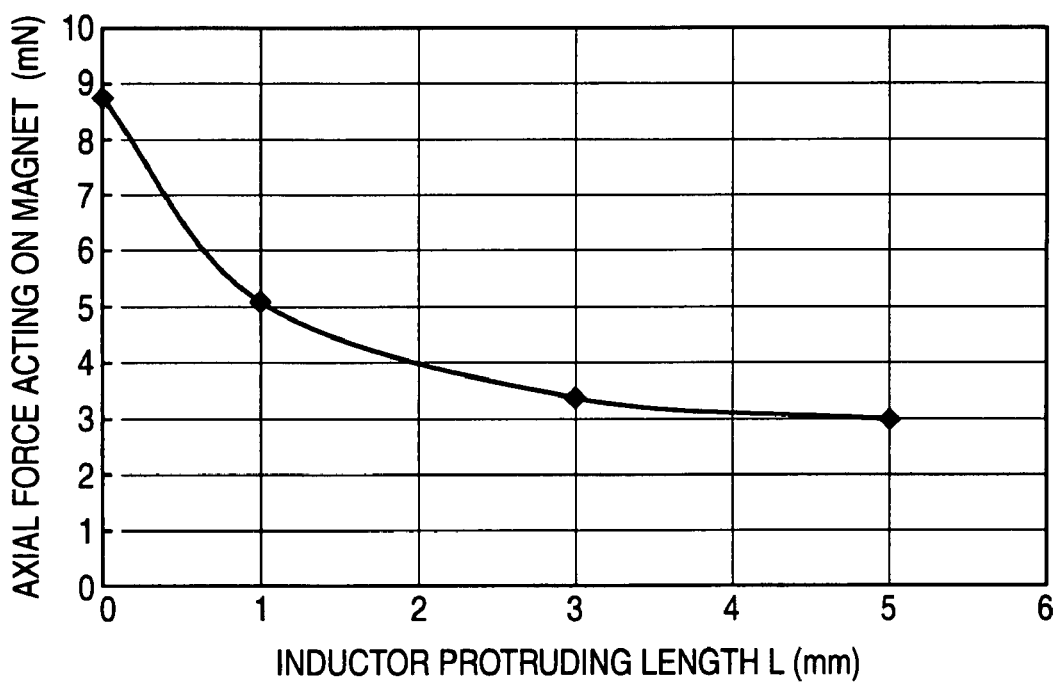
FIG. 28 is a graph chart illustrating a force which acts in the axial direction of a magnet.

FIG. 28 is a graph chart illustrating the force which acts in the axial direction of the magnet. The abscissa of FIG. 28 indicates a protruding amount L (see FIG. 25) of the tip ends of the inductors from the upstream end face of the magnet M, and the ordinate indicates the force acting on the magnet M in the axial direction (the force of pulling the magnet M in the downstream direction).

As shown in FIG. 28, in the case where the upstream end face of the magnet M and the positions of the tip ends of the inductors are at the same level (L=0 mm), a force of about 9 mN acts. When the protruding amount of the inductors is 1 mm, the acting force is reduced to about a half. When the protruding amount is 3 mm, the acting force is reduced to about one third. Namely, when the protruding amount of the inductors is 1 mm, a force of about 3.5 mN can be reduced, and when the protruding amount is 3 mm, a force of about 5.5 mN can be reduced.

In a small generator which is to be disposed in the above-described faucet apparatus, the total weight of a rotor vane and a magnet is about 3.5 gW (34.3 mN).

According to the second embodiment of the invention, when the tip ends of the inductors are slightly projected from the upstream end face of the magnet M, 10% to 20% of a force which is applied to the bearing portion by the total weight of the rotor vane and the magnet can be reduced.

In the above, the case where the stator 9 is disposed to be opposed to the downstream end face of the magnet M has been described. Alternatively, the stator 1009 may be disposed to be opposed to the upstream end face of the magnet M.

Figure 29:
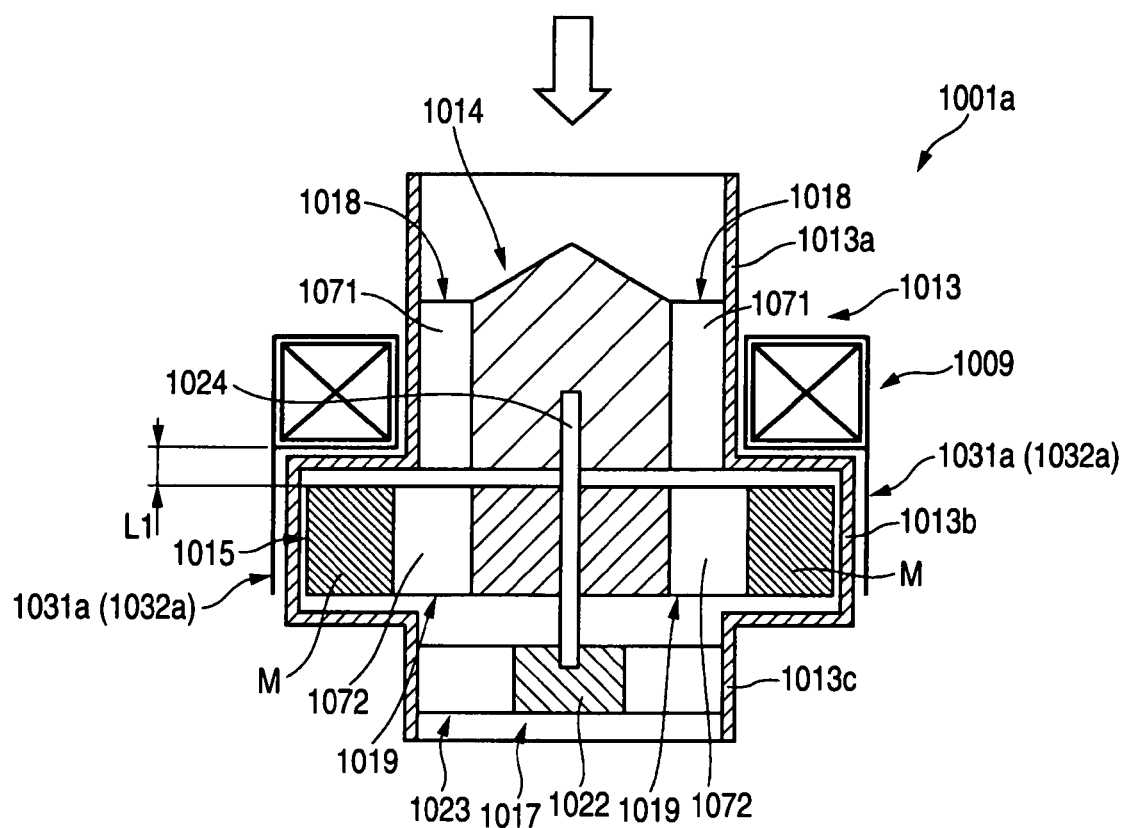
FIG. 29 is a schematic sectional view of a configuration where a stator is disposed to be opposed to an upstream end face of a magnet.

FIG. 29 is a schematic sectional view illustrating a case where the stator is disposed to be opposed to the upstream end face of the magnet.

The components which are identical with those described with reference to FIG. 25 are denoted by the same reference numerals, and their description is omitted.

As shown in FIG. 29, the coil 1050 disposed in the above-described stator 1009 is placed to be opposed to the upstream end face of the magnet M.

Parts of the inductors 1031a, 1032a are positioned on the upstream side of the upstream axial end face of the magnet M.

Namely, portions of the inductors 1031a, 1032a which exist between the downstream end face of the stator 1009 and the upstream end face of the magnet M are the portions which are positioned on the upstream side of the upstream axial end face of the magnet M. In this case, L1 in the figure is the protruding amount L1 of the inductors.

The magnetic attracting force acts between the portions and the magnet M, and hence the magnet M can be pulled toward the upstream side, and the force of pressing the center shaft 1024 against the shaft supporting portion 1022 can be reduced.

When the tip ends of the inductors 1031a, 1032a are positioned on the downstream side of the downstream end face of the magnet M, a force of pulling the magnet M toward the downstream side acts. Therefore, it is preferable that the tip ends of the inductors 1031a, 1032a are not positioned on the downstream side of the downstream end face of the magnet M. Namely, it is requested that the tip ends of the inductors 1031a, 1032a are positioned on the upstream side of the downstream axial end face of the magnet M, or the tip ends of the inductors 1031a, 1032a are located at the same position as the downstream axial end face of the magnet M as seen in the axial direction.

In the above, the case where the stator 1009 is disposed to be opposed to the upstream end face or downstream end face of the magnet M has been described. Alternatively, a pair of stators 1009 may be disposed to be opposed to the upstream end face and downstream end face of the magnet M, respectively.

Figure 30:
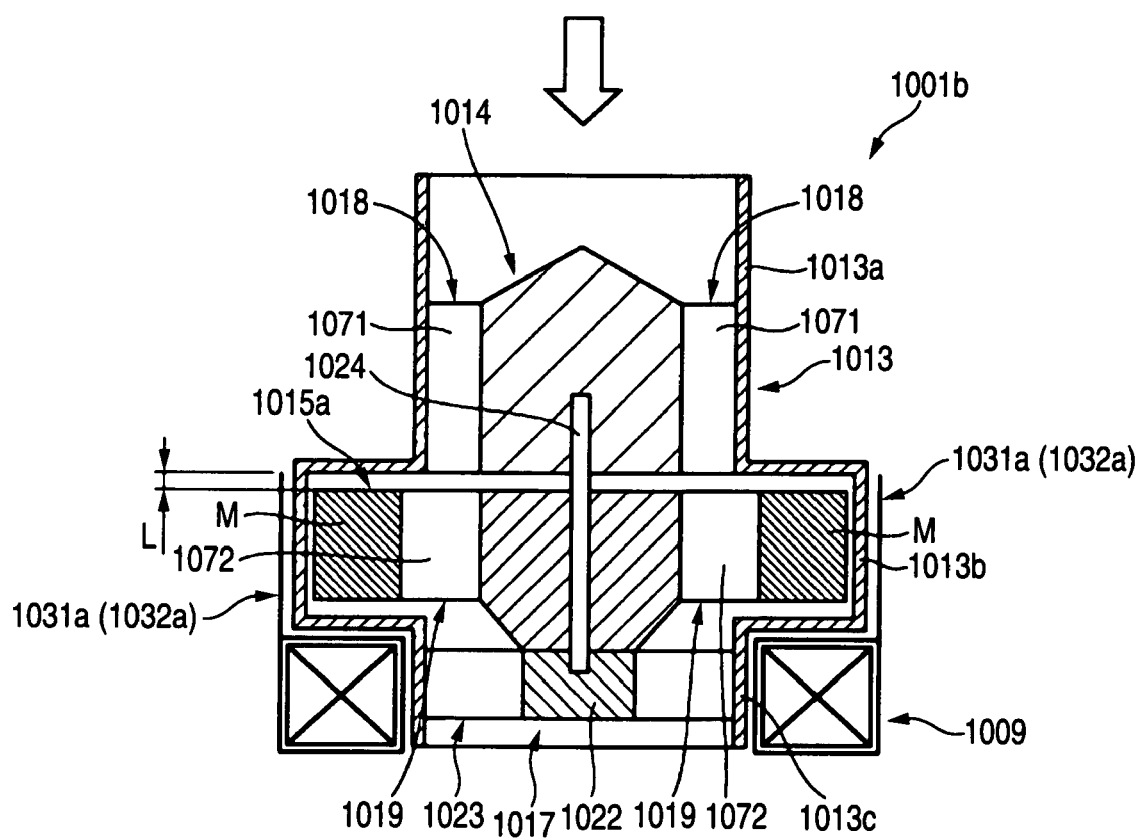
FIG. 30 is a schematic sectional view of a generator of another embodiment.

As shown in FIG. 30, a rotor vane 1015a disposed in a generator 100b may be disposed to be passed through the center shaft 1024 to be rotatable about the center shaft 1024. An end portion of the center shaft 1024 is supported and fixed to the pre-rotation stator vane 1014 the shaft supporting portion 1022. Furthermore, the tip ends of the inductors 1031a, 1032a are projected to be positioned on the upstream side of the upstream end face of the magnet M.

Also in the configuration, the magnetic attracting force acts between the portions and the magnet M, and hence the magnet M can be pulled toward the upstream side, and the force of pressing the rotor vane 1015a against the shaft supporting portion 1022 can be reduced.

Next, the functions of the faucet generator and automatic faucet apparatus of the second embodiment of the invention will be described.

When the user introduces a hand under the water discharging port 6 shown in FIGS. 2 and 3, the introduction is sensed by the sensor 7, and the solenoid valve 8 is opened by the controller 57. This causes the water flow to be supplied into the cylindrical body 1013 of the generator 1001, and the water flows inside the cylindrical body 1013 to be discharged from the water discharging port 6. When the user removes the hand from the area under the water discharging port 6, the removal is sensed by the sensor 7, and the solenoid valve 8 is closed by the controller 57 to automatically stop the water flow.

The water flow flowing into the cylindrical body 1013 flows over the surface of the conical member of the pre-rotation stator vane 1014 to spread radially outward, and, in the embodiment shown in FIG. 25, is formed as a swirling flow which swirls in the rightward direction about the axis center, to flow through the stator vane channels 1071 between the stator vane blades 1018.

The swirling flow which has flown through the stator vane channels 1071 enters the rotor vane channels 1072, and impinges on the upper inclined faces of the rotor vane blades 1019. In the embodiment, the swirling flow entering the rotor vane channels 1072 is a flow which swirls in the rightward direction about the axis center, and hence a rightward force acts on the rotor vane blades 1019, so that the rotor vane 1015 is rotated in the rightward direction. The water flow which flows through the rotor vane channels 1072 that are inside the inner circumferential face of the magnet M passes through the inside of the bearing 1017, and then passes through the inside of the cylindrical body 1013 to reach the water discharging port 6.

When the rotor vane 1015 is rotated, also the magnet M fixed to the vane is rotated. As shown in FIG. 5, the radially outward end face (outer circumferential face) of the magnet M is alternately magnetized with N and S poles along the circumferential direction (rotation direction). When the magnet M is rotated, therefore, the polarities of the inductors 1031a, 1032a which are opposed to the radially outward end face (outer circumferential face) of the magnet M, and those of the first and second yokes 1031, 1032 which are continuously contacted with the inductors are changed. As a result, the directions of interlinking magnetic fluxes with respect to the coil 1050 are changed, and an electromotive force is produced in the coil 1050, thereby performing electricity generation. The generated power is stored into the charger 56, and then used in the driving of, for example, the solenoid valve 8, the sensor 7, and the controller 57, and the like.

Hereinafter, a third embodiment of the invention will be described with reference to FIGS. 32 to 39. In the drawings, identical components are denoted by the same reference numerals.

The third embodiment of the invention provides a faucet generator wherein the generator includes: a rotor vane which has a rotation center that is substantially parallel to a water supply channel, and rotor vane blades that are disposed in the water supply channel to be rotatable about the rotation center; a magnet which is disposed in a radially outward direction of the rotor vane blades, and which is rotatable integrally with the rotor vane; a coil in which an electromotive force is produced by rotation of the magnet; and a stator having: a yoke which is disposed to surround the coil; and a plurality of inductors which extend from the yoke, and which are disposed to be separated from one another, and downstream end faces of the rotor vane blades are separately disposed to be positioned on the upstream side of the downstream end face of the magnet at a degree which can suppress uneven rotation of the rotor vane and noises.

According to the third embodiment of the invention, a faucet generator in which, even when the length of the rotor vane blades in a direction that is substantially perpendicular to a radial direction is shortened, fluctuation of a torque that is received by the rotor vane can be suppressed is provided.

Figure 31:
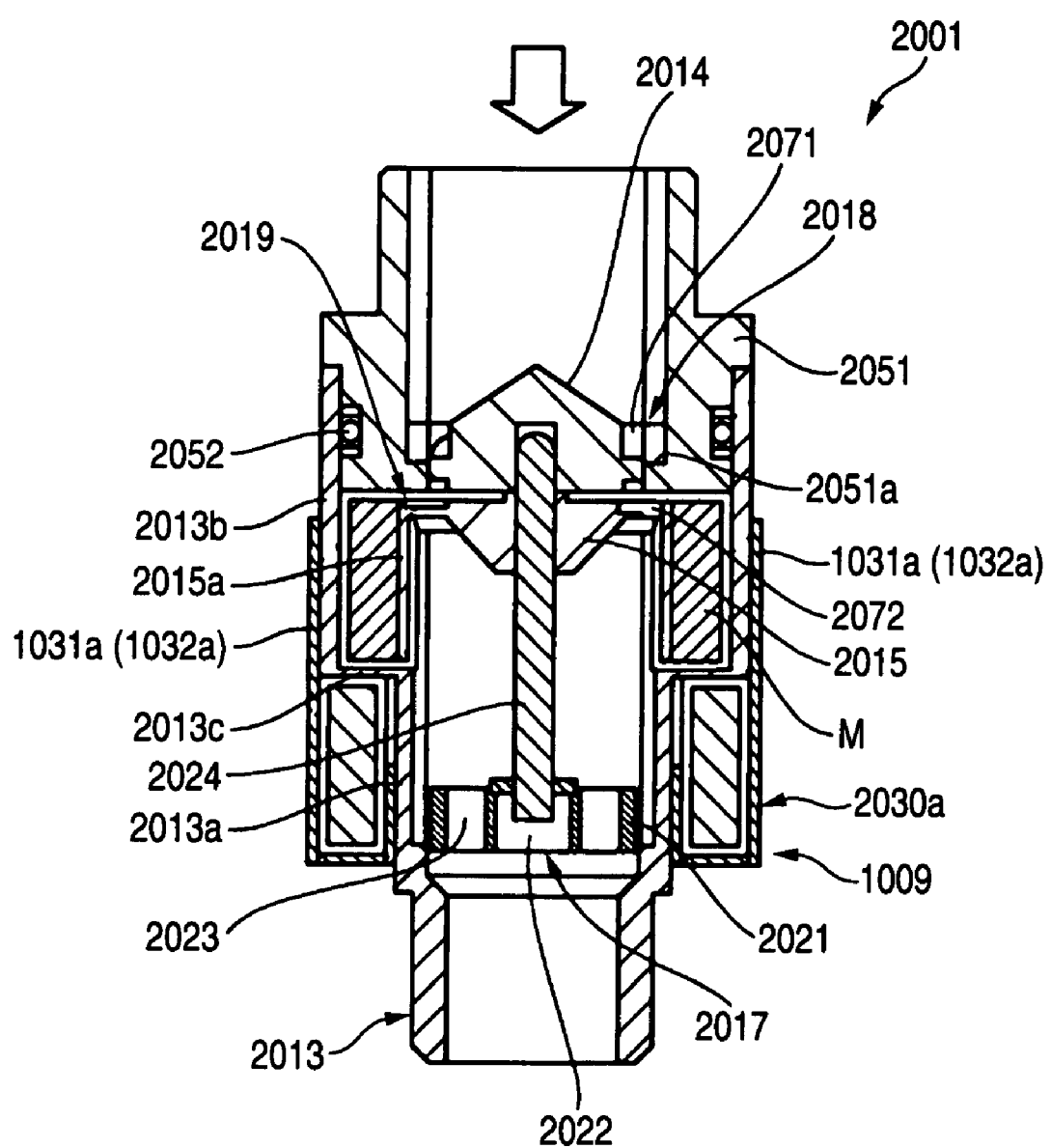
FIG. 31 is a schematic sectional view of a generator of a third embodiment of the invention.

FIG. 31 is a schematic sectional view of the generator 1 of the third embodiment of the invention.

The generator 2001 includes a cylindrical body 2013, a pre-rotation stator vane 2014, a rotor vane 2015, the magnet M, the stator 1009, and a sealing member 2051. These components are housed in the case 12 (see FIG. 3). The arrow which is drawn above the pre-rotation stator vane 2014 indicates the direction of the water flow.

The cylindrical body 2013 has a stepped shape consisting of a small-diameter portion 2013a and a large-diameter portion 2013b, and is disposed in the water discharger 3b which is shown in FIGS. 2 and 3, in a state where the interior of the cylindrical body communicates with the water supply channel. In this case, the cylindrical body is disposed in such a manner that the center axis direction of the cylindrical body 2013 is substantially parallel to the direction of the water flow, the small-diameter portion 2013a is directed toward the downstream side, and the large-diameter portion 2013b is directed toward the upstream side.

In the cylindrical body 2013, in the sequence starting from the upstream side, the pre-rotation stator vane 2014, the rotor vane 2015, and the bearing 2017 are disposed. The bearing 2017 is disposed inside the small-diameter portion 2013a, and the pre-rotation stator vane 2014 and the rotor vane 2015 are disposed inside the large-diameter portion 2013b.

The opening at the upstream end of the large-diameter portion 2013b is liquid-tightly closed by the sealing member 2051 through an O-ring 2052. A stepped hole is disposed inside the sealing member 2051. A step portion 2051a of the member is annularly formed, and the pre-rotation stator vane 2014 is supported on the step portion 2051a.

The pre-rotation stator vane 2014 has a shape in which a conical member is disposed integrally on one end face (the face positioned on the upstream side) of a columnar member. A plurality of projective stator vane blades 2018 which are projected in a radially outward direction are disposed on the circumferential face of the pre-rotation stator vane 2014. The stator vane blades 2018 are inclined from the upstream side toward the downstream side while being twisted in the rightward direction about the axis center of the pre-rotation stator vane 2014. Each space which is between the stator vane blades 2018 that are adjacent to each other in the circumferential direction functions as a stator vane channel 2071. The pre-rotation stator vane 2014 is fixed to the cylindrical body 2013, and is not rotated.

The rotor vane 2015 is disposed on the downstream side of the pre-rotation stator vane 2014. The rotor vane 2015 has a columnar shape, and a plurality of projective rotor vane blades 2019 which are projected in a radially outward direction are disposed. Contrary to the stator vane blades 2018, the rotor vane blades 2019 are inclined from the upstream side toward the downstream side while being twisted in the leftward direction about the axis center. Each space which is between adjacent ones of the rotor vane blades 2019 that are adjacent to each other in the circumferential direction functions as a rotor vane channel 2072.

A center shaft 2024 is disposed to be projected from the bearing 2017 toward the upstream side. The center shaft 2024 is integrated with the bearing 2017. The rotor vane 2015 is disposed to pass through the center shaft 2024, and rotatable about the center shaft 2024. The rotor vane 2015 and the center shaft 2024 may be integrated with each other, and the both end portions of the center shaft 2024 may be supported by the pre-rotation stator vane 2014 and the bearing 2017 so that the rotor vane 2015 integrated with the center shaft 2024 is rotated. Namely, the rotor vane 2015 having the rotor vane blades is configured to have a rotation center which is substantially parallel to the water supply channel, and to be disposed in the water supply channel to be rotatable about the rotation center.

The bearing 2017 includes: a ring member 2021 which is fixed to the inner circumferential face of the cylindrical body 2013; and a shaft supporting portion 2022 which is disposed at the center of the ring member 2021. The ring member 2021 and the shaft supporting portion 2022 are coupled to each other by coupling members 2023 which are radially disposed. The gaps between the coupling members 2023 are not closed, and are passed through the bearing. Therefore, the water flow inside the cylindrical body 2013 is not disturbed.

A rotor vane ring 2015a which is fixed to the radially outer side end face of the rotor vane blades 2019, and the annular magnet M which is fixed to an outer circumferential portion of the rotor vane ring 2015a are housed in the large-diameter portion 2013b of the cylindrical body 2013. Outside the small-diameter portion 2013a of the cylindrical body 2013, the stator 1009 is disposed to be opposed to an end face which is on the downstream side of the magnet M, and which is substantially perpendicular to a radial direction. The rotor vane ring 2015a is not always required. In the case where the ring is disposed, however, the rotor vane 2015 and the magnet M can be more firmly integrated with each other.

The third embodiment of the invention has the structure where the stator 1009 is opposed to the end face of the magnet M which is substantially perpendicular to a radial direction. Therefore, the radial dimension can be reduced as compared with the case where the stator 1009 is opposed to the radially outside of the magnet M. Furthermore, the radial dimension of the rotor vane 2015 can be increased by a degree corresponding to the configuration in which the stator 1009 is not disposed radially outside the rotor vane 2015, so that the electric-generating capacity can be increased.

In the case where the cylindrical body 2013 is formed by a material having a low electrical conductivity, such as a resin, the eddy current loss can be reduced as compared with the case where the cylindrical body is formed by a metal, and hence the electric-generating capacity can be further increased. In this case, only the large-diameter portion 2013b through which magnetic fluxes are passed may be formed by a material having a low electrical conductivity, such as a resin.

Next, the magnet M and the stator 1009 will be described.

A schematic perspective view of the magnet M is as shown in FIG. 4.

A schematic perspective view of the stator 1009 is as shown in FIG. 27.

As shown in FIG. 4, the radially outward end face (outer circumferential face) of the magnet M is alternately magnetized with N and S poles along the circumferential direction. Although slight in amount, the magnetic fluxes from the N and S poles leak to the end face in the direction which is substantially perpendicular to a radial direction. The amount can be controlled by the magnetizing method.

As shown in FIG. 27, the stator 1009 has: a first yoke 1031 and second yoke 1032 all of which are made of a soft magnetic material (for example, rolled steel); inductors 1031a, 1031b, 1032a which are continuously contacted with the yokes; and the coil 1050 which is placed in a space surrounded by the first yoke 1031, the second yoke 1032, and the inductors 1031a, 1031b, 1032a.

In the coil 1050 which is annularly wound, the inner circumferential face, the outer circumferential face, and the both end faces in the direction which is substantially perpendicular to a radial direction are surrounded by the first yoke 1031, the second yoke 1032, the inductors 1031a, 1031b, 1032a, and the third yoke 1033.

The first yoke 1031 has a substantially annular shape, and is placed so as to surround the inner circumferential face of the coil 1050. The plurality of inductors 1031b are integrally disposed toward the radially outer side, in one end portion of the yoke in the direction which is substantially perpendicular to a radial direction. In the first yoke 1031, a portion which is opposed to the inner circumferential face of the coil 1050 is substantially perpendicular to the inductors 1031*b*. The inductors 1031*b* are placed at regular intervals along the circumferential direction of the coil 1050. One ends of the inductors 1031*b* further extend in the direction which is substantially perpendicular to a radial direction of the coil 1050 to form the inductors 1031*a*.

The second yoke 1032 has a substantially annular shape, and is placed so as to surround the outer circumferential face portion of the coil 1050. The plurality of inductors 1032*a* are integrally disposed in the direction which is substantially perpendicular to a radial direction, in one end portion of the yoke in the direction which is substantially perpendicular to a radial direction. The inductors 1032*a* are placed at regular intervals along the circumferential direction of the coil 1050, and between the inductors 1031*a* of the first yoke 1031. Namely, the inductors 1031*a* of the first yoke 1031, and the inductors 1032*a* of the second yoke 1032 are arranged alternately and separately in the circumferential direction of the coil 1050. The inductors 1031*a*, 1032*a* are disposed immediately above a portion (the second yoke 1032) which is placed so as to surround an outer circumferential face of the coil 1050. The distances from the center of the coil 1050 to the inductors 1031*a*, 1032*a* are approximately equal to each other.

The inductors 1031*a*, 1032*a* are disposed so as to extend in the direction which is substantially perpendicular to a radial direction. The inner circumferential faces (the faces on the side located in the center direction of the coil 1050) of the inductors are opposed to the outer circumferential face (the face in a radially outward direction) of the magnet M. The inductors 1031*b* are opposed to one end face of the coil 1050. The one end face of the coil 1050 is opposed to the end face of the magnet M in the direction which is substantially perpendicular to a radial direction across the inductors 1031*b* and a flange portion 2013*c* of the cylindrical body 2013.

When the radial dimension of the generator 2001 is to be reduced, also the radial dimension of the magnet M must be reduced. Also in this case, however, the dimension of the magnet M in a direction which is substantially perpendicular to a radial direction is not required to be reduced, and, in some cases, can be increased.

In the third embodiment of the invention, the inductors 1031*a*, 1032*a* are disposed to be opposed to the outer circumferential face of the magnet M. Therefore, the magnetic fluxes from the outer circumferential face of the magnet M can be guided to the coil 1050 through the inductors 1031*a*, 1032*a*. Even in the case where the radial dimension is reduced, the influence can be reduced, and a predetermined electric-generating capacity can be ensured.

In the third embodiment of the invention, the inductors 1031*b* are disposed to the end face of the magnet M in the direction which is substantially perpendicular to a radial direction. Therefore, also the magnetic fluxes from the end face of the magnet M in the direction which is substantially perpendicular to a radial direction can be guided to the coil 1050 through the inductors 1031*b*, and the electric-generating capacity can be further increased.

When the radial direction dimension of the generator 1 can be reduced while ensuring the electric-generating capacity, for example, also the dimensions of the automatic faucet apparatus 3 in which the generator 2001 is disposed can be reduced. As a result, the installation property, operability, and the like of the automatic faucet apparatus 3 can be improved. Furthermore, the tolerability of employment of an appearance design of the automatic faucet apparatus 3 can be improved.

For example, a modern design which is slenderer than the conventional one can be employed.

The third yoke 1033 has a ring plate-like shape, and is disposed to be opposed to the other end face portion of the coil 1050. A part of the outer circumferential side of the third yoke 1033 is cut away so that a coil wiring takeout portion which is not shown is formed.

The third yoke 1033 is coupled to end portions of the first yoke 1031 and the second yoke 1032 which are opposite to the end portions where the respective inductors 1031*a*, 1031*b*, 1032*a* are disposed. The coil 1050 is housed in a space surrounded by the first yoke 1031 to the third yoke 1033. Wirings from the coil 1050 are drawn out from the coil wiring takeout portion which is formed in the outer circumferential side of the third yoke 1033, and which is not shown, to the outside. In this way, the wirings of the coil 1050 are drawn out from the outer circumferential side to the outside through the coil wiring takeout portion which is formed in the outer circumferential side of the third yoke 1033, and which is not shown. As compared with the case where the wirings are drawn out from the inner circumferential side, therefore, the wirings to the controller 57 are laid easily.

For example, convex-like positioning portions which are not shown are disposed in the third yoke 1033. When the positioning portions are engaged with concave-like cutout portions formed in the first yoke 1031 and the second yoke 1032, the first yoke 1031 and the second yoke 1032 are positioned at predetermined positions in the circumferential direction, respectively. According to the configuration, the pitch accuracy between the inductors 1031*a*, 1032*a* can be improved. Alternatively, concave-like cutout portions may be disposed in the third yoke 1033, and convex-like positioning portions may be disposed in the first yoke 1031 and the second yoke 1032.

Cutout portions 1039*a* are disposed in the second yoke 1032, and cutout portions 1039*b* are disposed in the third yoke 1033. In this way, in the yokes 1032, 1033, the cutout portions 1039*a*, 1039*b* which are formed by cutting away portions between adjacent inductors from the one end sides where the inductors 1031*a*, 1032*a* are disposed are intermittently disposed in the portion which is disposed so as to surround the circumferential face portion of the coil, whereby the yokes 1032, 1033 are magnetically insulated from each other in the circumferential direction. In the magnetic path which is formed along the circumferential faces of the yokes 1032, 1033, portions which are not required for electricity generation are cut away, so that the iron loss can be suppressed and the electric-generating capacity can be increased.

In the above, the case where the stator 1009 is disposed to be opposed to the downstream end face of the magnet M has been described. Alternatively, the stator 1009 may be disposed to be opposed to the upstream end face of the magnet M, or a pair of stators 1009 may be disposed to be opposed to the upstream end face and downstream end face of the magnet M, respectively.

Next, an influence exerted by the length of the rotor vane blades in the direction which is substantially perpendicular to a radial direction, and that of the magnet in the direction which is substantially perpendicular to a radial direction will be described.

Figure 32:
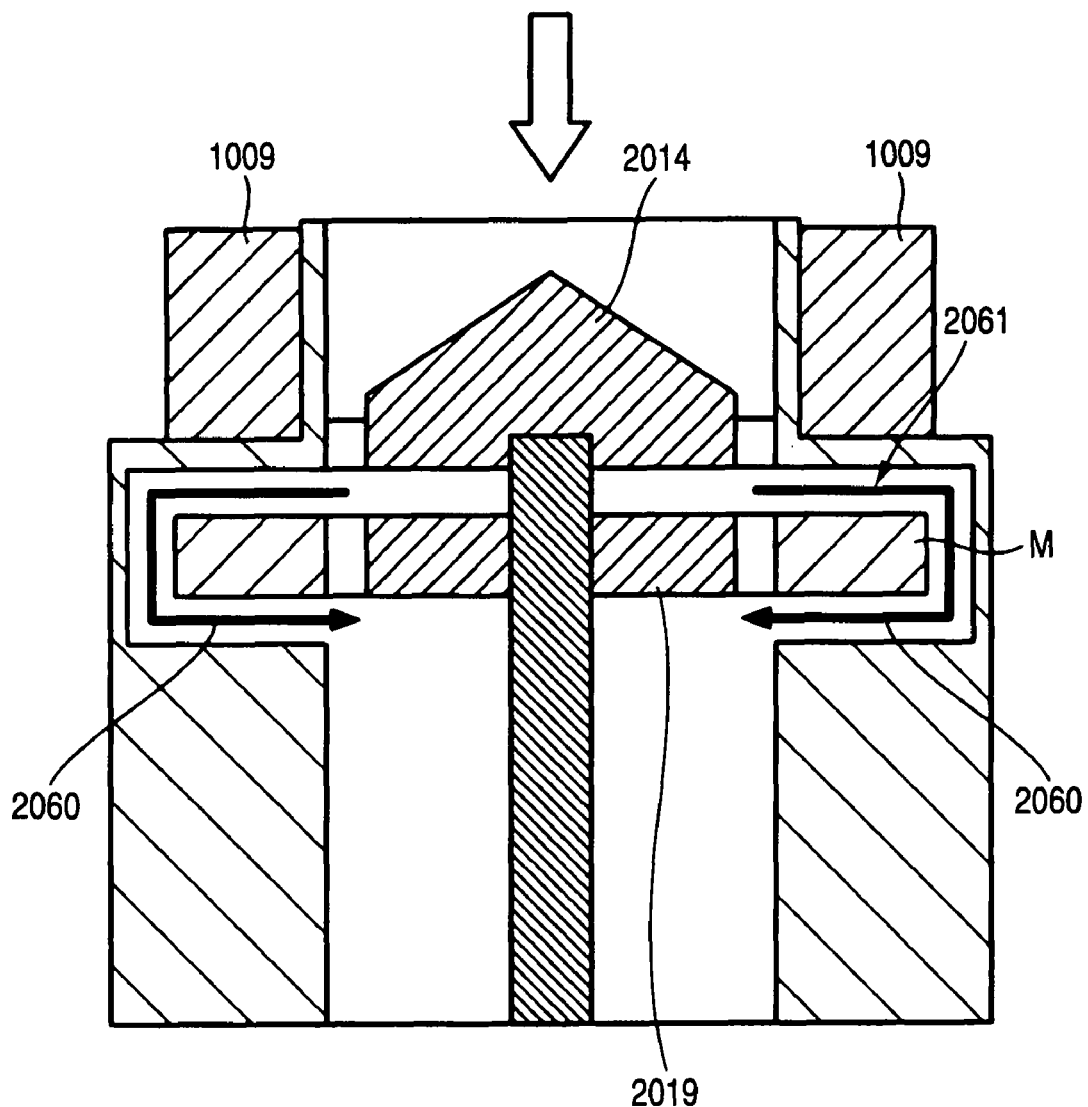
FIG. 32 is a schematic sectional view of a configuration where the length of rotor vane blades in a direction which is substantially perpendicular to a radial direction is made equal to that of the magnet in a direction which is substantially perpendicular to a radial direction, and both the lengths are shortened.

FIG. 32 is a schematic sectional view illustrating a case where the length of the rotor vane blades in the direction which is substantially perpendicular to a radial direction is made equal to that of the magnet in the direction which is substantially perpendicular to a radial direction, and both the lengths are shortened. The arrow in the figure indicates the direction of the water flow. In FIG. 32, the stator 1009 is placed to be opposed to the upstream end face of the magnet M.

Figure 33:
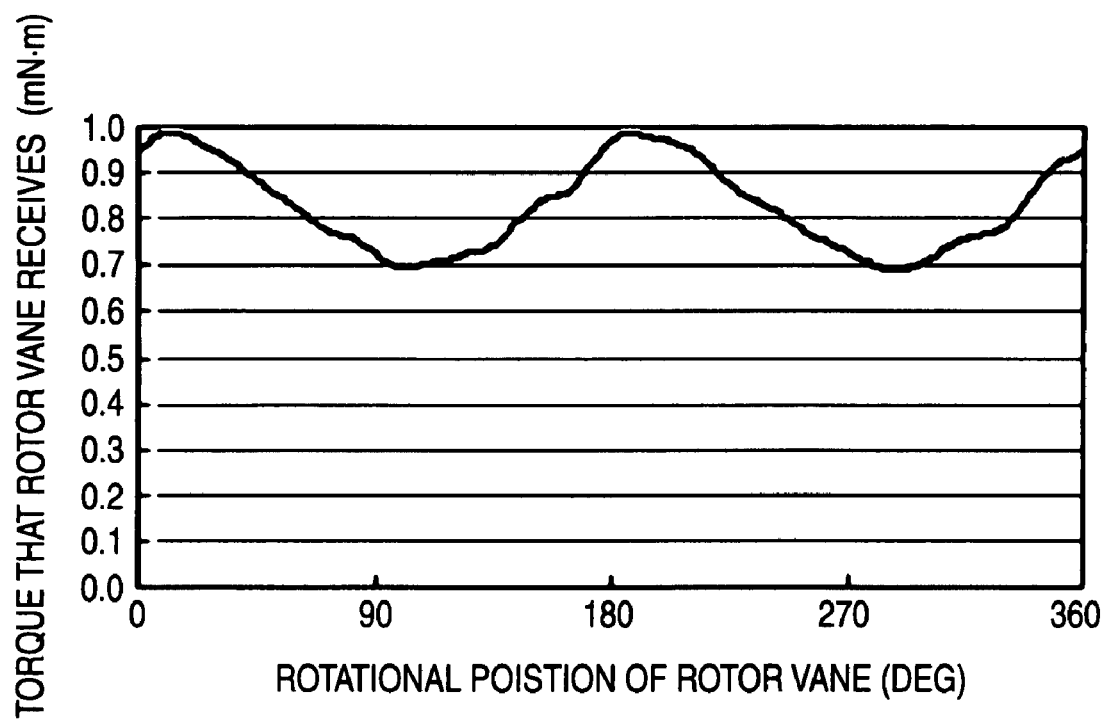
FIG. 33 is a graph chart illustrating a torque which is received by the rotor vane in the case of FIG. 32.

FIG. 33 is a graph chart illustrating a torque which is received by the rotor vane in the case of FIG. 32. FIG. 33 shows results of simulations in which the torque received by the rotor vane was obtained while the number of rotations of the rotor vane was set to 2,500 rpm.

As means for improving the output of a generator without increasing the size of the generator, it may be contemplated that the length of rotor vane blades in a direction which is substantially perpendicular to a radial direction is shortened.

As shown in FIG. 33, with respect to the torque received by the rotor vane in the case of FIG. 32, the average pressure torque is 0.84 mN·m, and the pulsation width is 0.28 mN·m. In this specification, the pulsation width means the width of vibration with respect to the average pressure torque. The pulsation ratio which is a ratio of the pulsation width to the average pressure torque is 33%.

When the pulsation ratio exceeds 25%, uneven rotation of the rotor vane and noises are excessively increased, and impede the practical use.

When, as shown in FIG. 32, the length of the rotor vane blades in the direction which is substantially perpendicular to a radial direction is made equal to that of the magnet in the direction which is substantially perpendicular to a radial direction, and both the lengths are shortened, therefore, the torque received by the rotor vane is largely fluctuated, and uneven rotation and noises are excessively increased.

The cause of the torque fluctuation is not certain, but the followings may be considered.

When the length of the magnet in the direction which is substantially perpendicular to a radial direction is shortened, also that of a bypass path 2060 which is formed in a radially outward direction of the magnet M is shortened. Therefore, a pulsating flow (a bypass flow 2061) which flows from the pre-rotation stator vane 2014 into the bypass path 2060 is discharged from the outlet of the bypass path 2060 without being attenuated. Since the length of the rotor vane blades in the direction which is substantially perpendicular to a radial direction is made equal to that of the magnet in the direction which is substantially perpendicular to a radial direction, the outlets of the rotor vane blades 2019 are in close proximity to the outlet of the bypass path 2060. As a result, it seems that the water flow discharge from the outlet of the bypass path 2060 affects the rotation of the rotor vane and the flow in the rotor vane, and they become unstable, so that the torque received by the rotor vane is largely fluctuated.

As means for suppressing the fluctuation of the torque received by the rotor vane, a method in which the outlet of the bypass path is separated from the outlets of the rotor vane blades 2019 may be contemplated.

Figure 34:
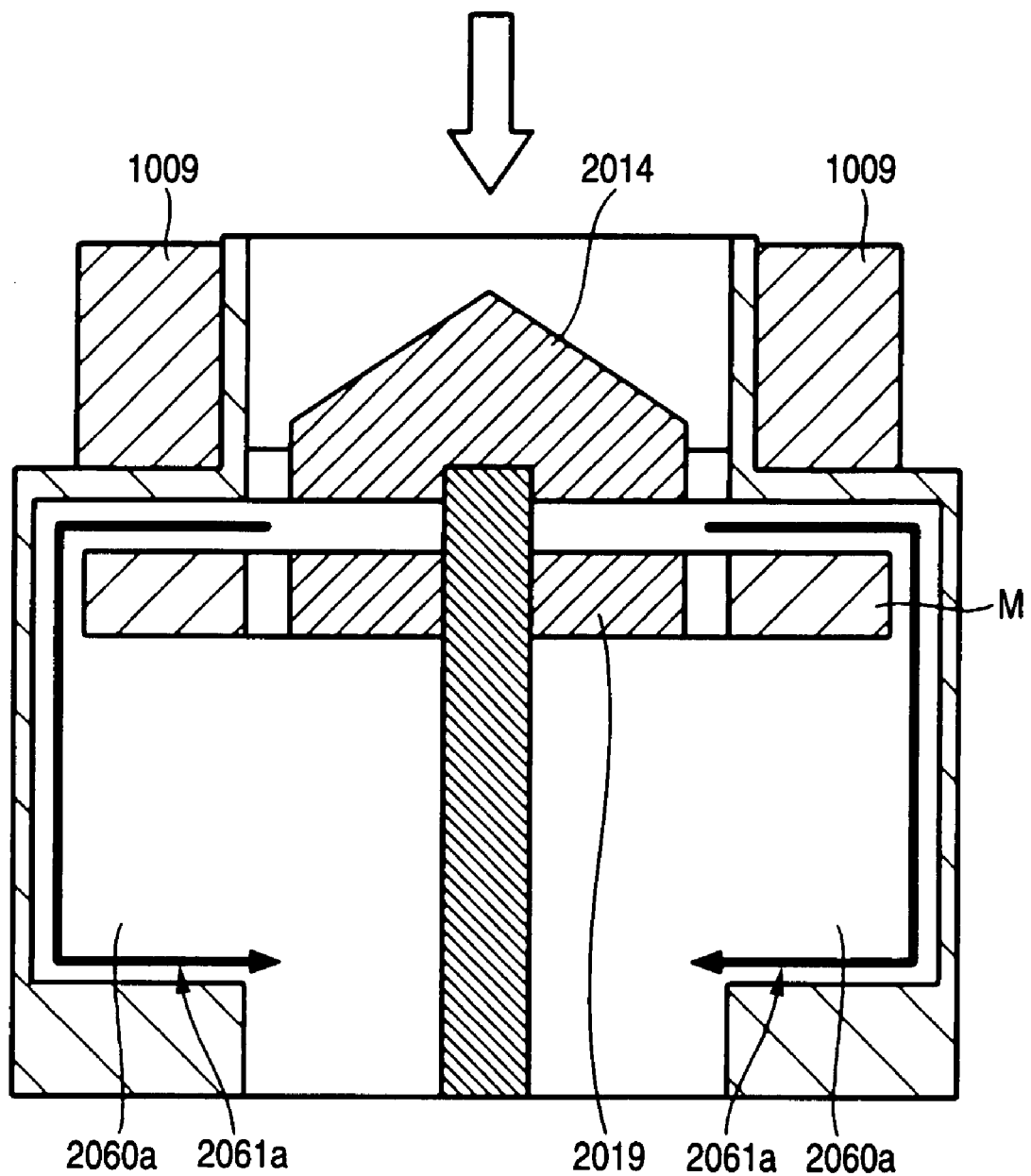
FIG. 34 is a schematic sectional view of a configuration where an outlet of a bypass path is separated from the outlets of the rotor vane blades.

FIG. 34 is a schematic sectional view illustrating a case where the outlet of the bypass path is separated from the outlets of the rotor vane blades. The arrow in the figure indicates the direction of the water flow. In FIG. 34, the stator 1009 is placed to be opposed to the upstream end face of the magnet M.

Figure 35:
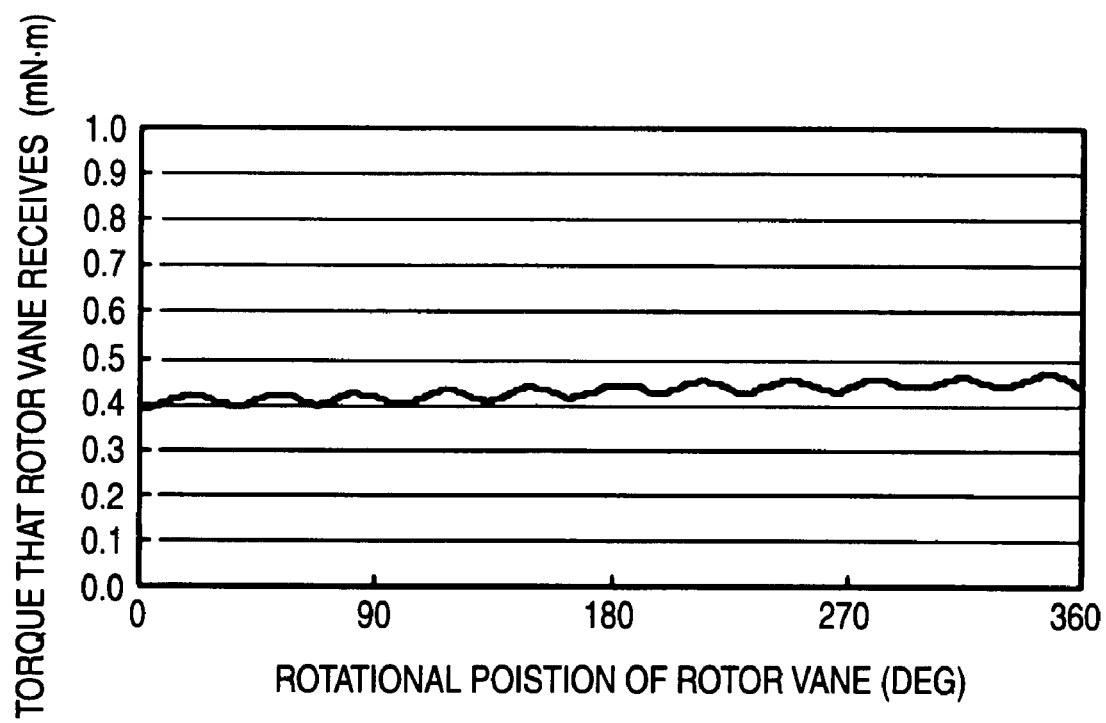
FIG. 35 is a graph chart illustrating a torque which is received by the rotor vane in the case of FIG. 34.

FIG. 35 is a graph chart illustrating the torque which is received by the rotor vane in the case of FIG. 34. FIG. 35 shows results of simulations in which the torque received by the rotor vane was obtained while the number of rotations of the rotor vane was set to 2,500 rpm.

As shown in FIG. 34, when the outlet of a bypass path 2060a is separated from the outlets of the rotor vane blades 2019, the influences which are exerted by a bypass flow 2061a discharged from the outlet of the bypass path 2060a on the rotation of the rotor vane and the flow in the rotor vane can be largely reduced. As shown in FIG. 35, therefore, the fluctuation of the torque received by the rotor vane can be largely reduced.

However, this configuration results in that the outlet of the bypass path 2060a is widened, and the bypass flow 2061a easily flows out from the bypass path 2060a. Therefore, the amount of water flowing into the bypass path 2060a is increased, and that of water flowing toward the rotor vane is correspondingly reduced. As a result, there arises a new problem in that, as shown in FIG. 35, the average pressure torque is reduced to about a half.

In the case where it is necessary to shorten the length of the rotor vane blades in a direction that is substantially perpendicular to a radial direction, the upstream end face of the rotor vane is aligned with that of the magnet M, and the downstream end faces of the rotor vane blades are separated to be positioned on the upstream side of the downstream end face of the magnet, whereby suppression of reduction of the average pressure torque, and fluctuation of the torque received by the rotor vane can be performed.

Figure 36:
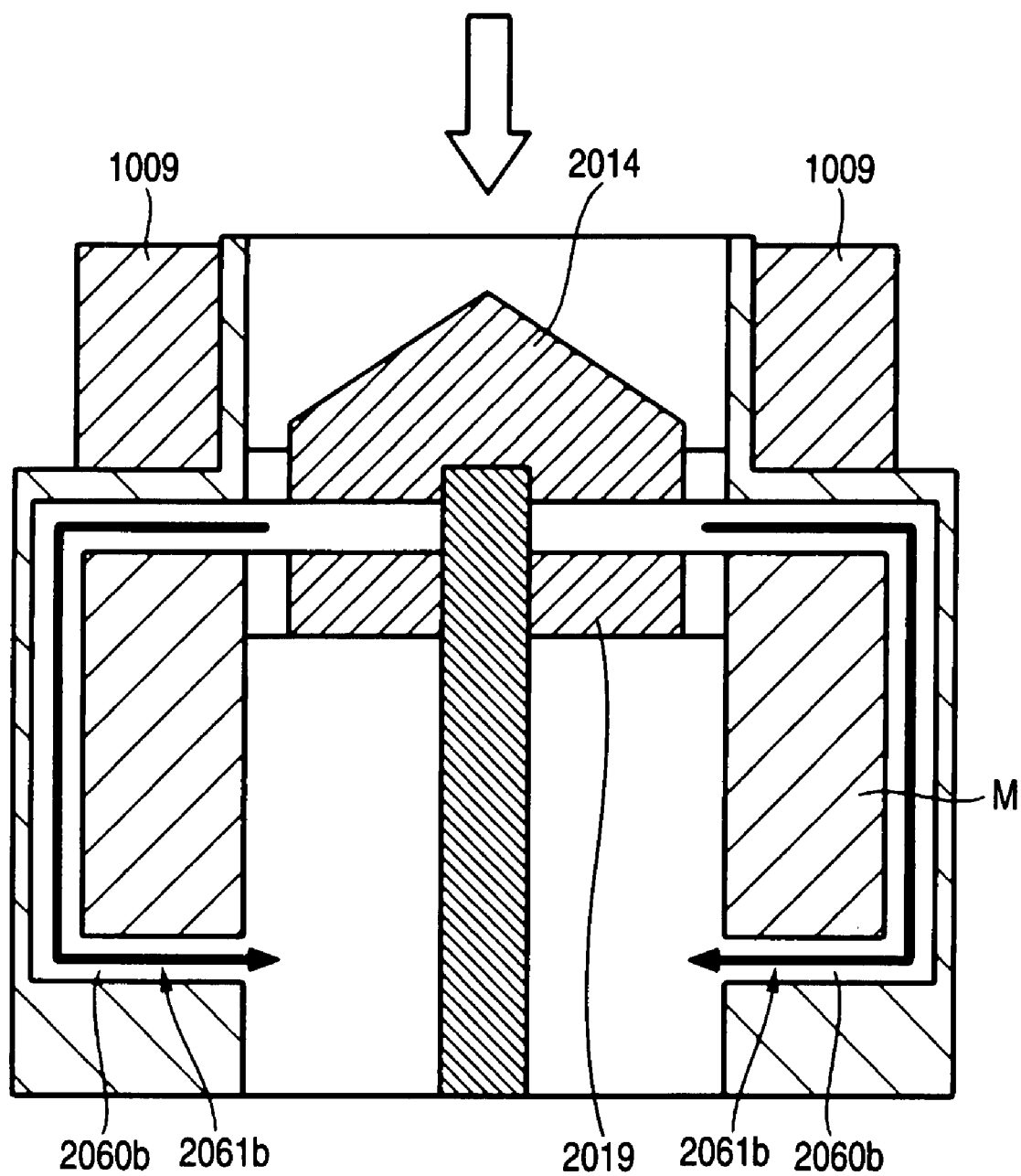
FIG. 36 is a schematic sectional view of a configuration where a downstream end face of the rotor vane is separated from that of a magnet M so that the downstream end face of the rotor vane is positioned on the upstream side of that of the magnet.

FIG. 36 is a schematic sectional view illustrating a case where the downstream end face of the rotor vane is separated from that of the magnet M so that the downstream end face of the rotor vane is positioned on the upstream side of the downstream end face of the magnet. The arrow in the figure indicates the direction of the water flow. In FIG. 36, the stator 1009 is placed to be opposed to the downstream end face of the magnet M.

Figure 37:
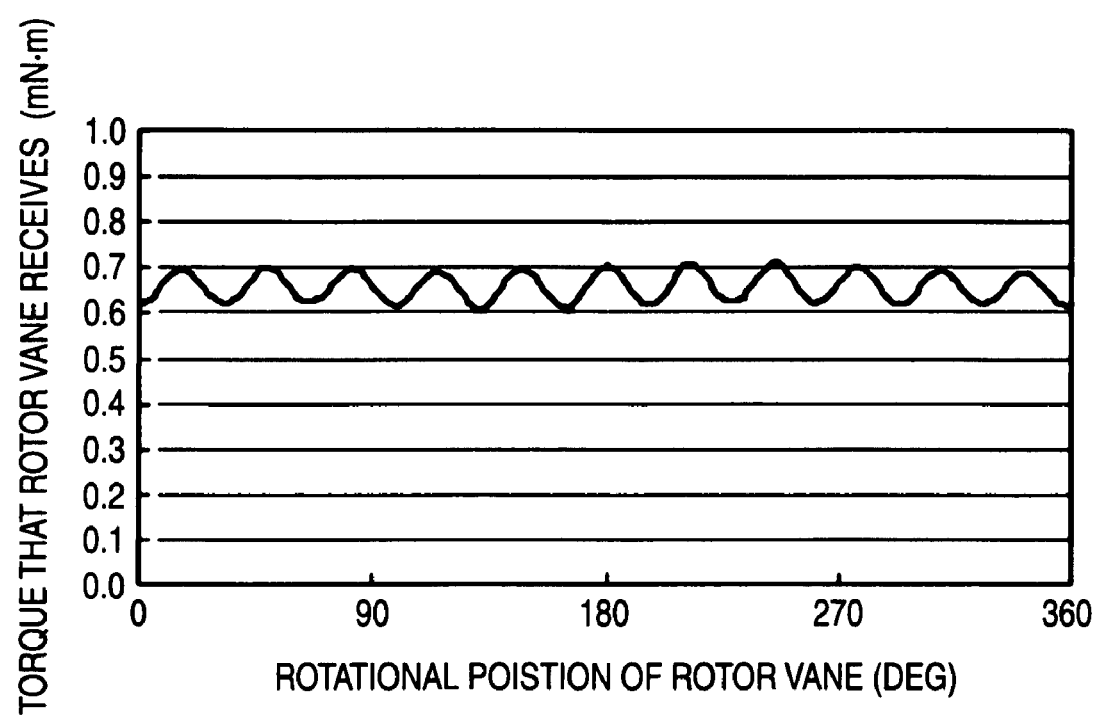
FIG. 37 is a graph chart illustrating a torque which is received by the rotor vane in the case of FIG. 36.

FIG. 37 is a graph chart illustrating a torque which is received by the rotor vane in the case of FIG. 36. FIG. 37 shows results of simulations in which the torque received by the rotor vane was obtained while the number of rotations of the rotor vane was set to 2,500 rpm.

In the case shown in FIG. 36, unlike that shown in FIG. 32, the length of the magnet in the direction which is substantially perpendicular to a radial direction is not shortened, and hence the length of a bypass path 2060b which is formed in a radially outward direction of the magnet M is not shortened. Therefore, a pulsating flow (a bypass flow 2061b) which flows from the pre-rotation stator vane 2014 into the bypass path 2060b is discharged from the outlet of the bypass path 2060 in a state where the flow is attenuated. Furthermore, the outlet of the bypass path 2060b is separated from the outlets of the rotor vane blades 2019. Therefore, the influences which are exerted by the bypass flow 2061b discharged from the outlet of the bypass path 2060b on the rotation of the rotor vane and the flow in the rotor vane can be largely reduced.

As a result, as shown in FIG. 37, the increase of the pulsation width can be suppressed while suppressing the reduction of the average pressure torque.

Preferably, the rotor vane blades 2019 are disposed upstream as far as possible of the magnet M, and, more preferably, the upstream end face of the magnet M is aligned with the upstream end faces of the rotor vane blades 2019. According to the configuration, the energy of the swirling flow from the pre-rotation stator vane 2014 can be efficiently converted to electric power.

When a ratio of the length of the magnet M in the direction which is substantially perpendicular to a radial direction to that of the rotor vane blades in the direction which is substantially perpendicular to a radial direction is set to be larger than a predetermined value, the reduction of the average pressure torque can be suppressed, and also the increase of the pulsation width can be suppressed.

Figure 38:
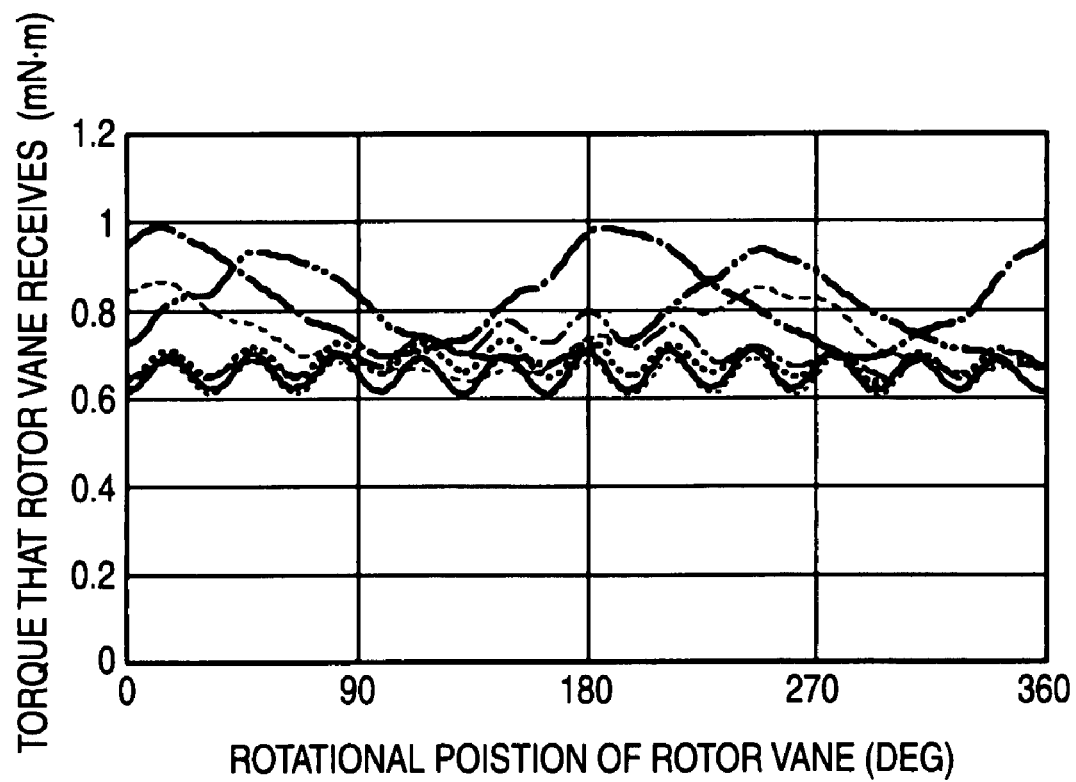
FIG. 38 is a graph chart showing relationships between a ratio of the length of the magnet in a direction which is substantially perpendicular to a radial direction to that of the rotor vane blades in a direction which is substantially perpendicular to a radial direction, and the torque which is received by the rotor vane.
Figure 38:
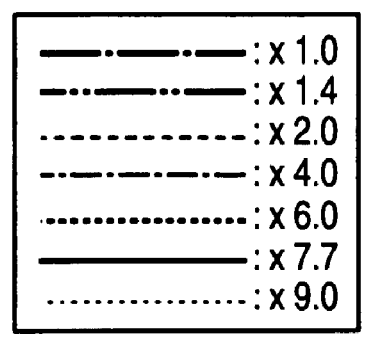
Figure 39:
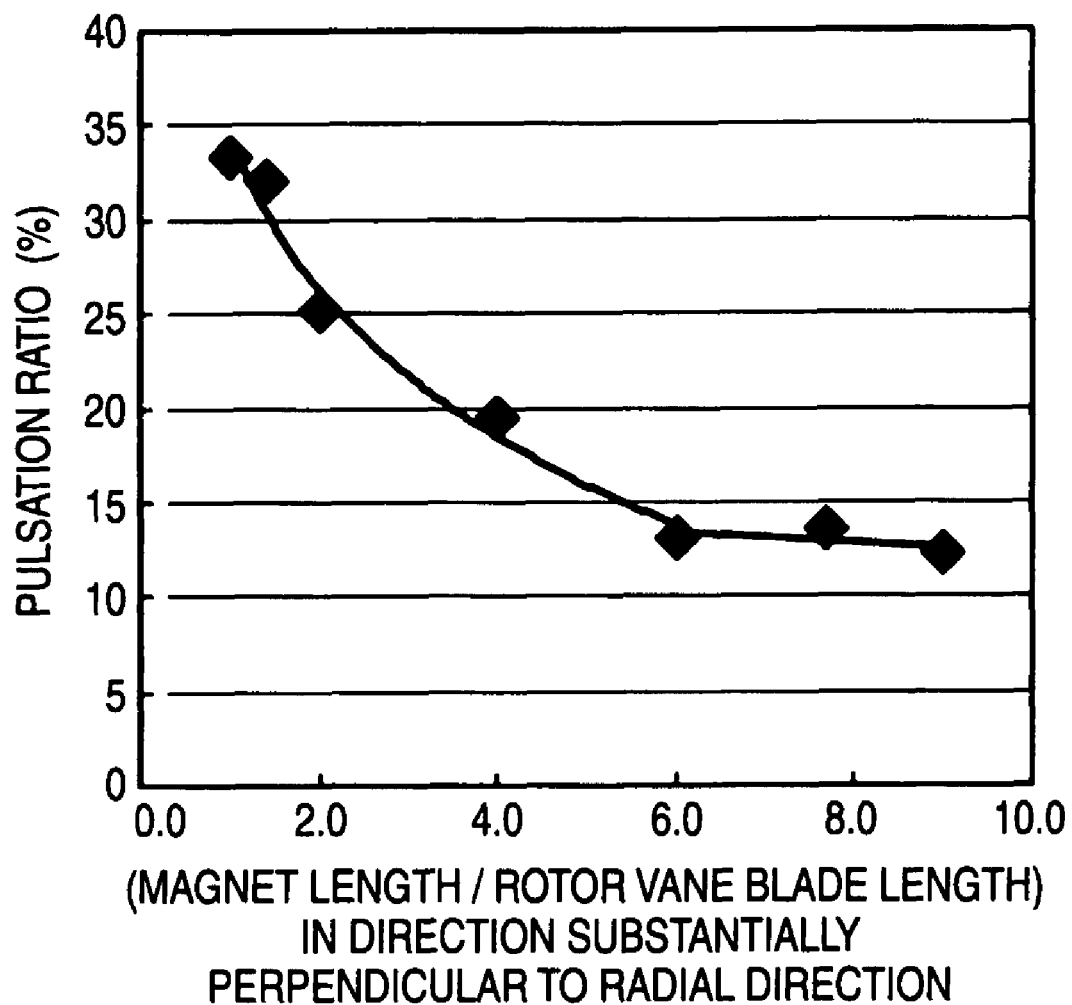
FIG. 39 is a graph chart illustrating the pulsation ratio in the case of FIG. 38.

FIG. 38 is a graph chart illustrating relationships between the ratio of the length of the magnet in the direction which is substantially perpendicular to a radial direction to that of the rotor vane blades in the direction which is substantially perpendicular to a radial direction, and the torque which is received by the rotor vane. FIG. 38 shows results of simulations in which the torque received by the rotor vane was obtained while the number of rotations of the rotor vane was set to 2,500 rpm. FIG. 39 is a graph chart illustrating the pulsation ratio in the case of FIG. 38.

Table 1 summarizes values in the case of FIG. 38.

TABLE 1

| Length of magnet in direction substantially perpendicular to radial direction/Length of rotor vane blades in direction substantially perpendicular to radial direction | Maximum Torque (mN · m) | Minimum Torque (mN · m) | Average Pressure Torque (mN · m) | Pulsation Width (mN · m) | Pulsation Ratio |
|---|---|---|---|---|---|
| 1.0 | 0.98 | 0.70 | 0.84 | 0.28 | 33% |
| 1.4 | 0.94 | 0.68 | 0.81 | 0.26 | 32% |
| 2.0 | 0.85 | 0.66 | 0.755 | 0.19 | 25% |
| 4.0 | 0.79 | 0.65 | 0.72 | 0.14 | 19% |
| 6.0 | 0.73 | 0.64 | 0.685 | 0.09 | 13% |
| 7.7 | 0.71 | 0.62 | 0.665 | 0.09 | 14% |
| 9.0 | 0.69 | 0.61 | 0.65 | 0.08. | 12% |

As seen from FIGS. 38 and 39 and Table 1, when the length of the magnet in the direction which is substantially perpendicular to a radial direction is set to twice or more that of the rotor vane blades in the direction which is substantially perpendicular to a radial direction, the pulsation ratio can be reduced to 25% or less while suppressing the reduction of the average pressure torque. As described above, when the pulsation ratio exceeds 25%, uneven rotation of the rotor vane and noises are excessively increased, and impede the practical use. Therefore, it is preferable that the length of the magnet in the direction which is substantially perpendicular to a radial direction is set to twice or more that of the rotor vane blades in the direction which is substantially perpendicular to a radial direction. In this case, from the viewpoint of reduction of the pulsation ratio, the upper limit is not particularly restricted. When the length of the magnet in the direction which is substantially perpendicular to a radial direction exceeds ten times that of the rotor vane blades in the direction which is substantially perpendicular to a radial direction, the weight becomes excessively large, and there is a possibility that a problem in that hydro power required for rotating the rotor vane 15 becomes excessively large is produced, Therefore, it is preferable that the length of the magnet in the direction which is substantially perpendicular to a radial direction is set to twice or more and ten times or less that of the rotor vane blades in the direction which is substantially perpendicular to a radial direction. When the length of the magnet in the direction which is substantially perpendicular to a radial direction is set to six times or more that of the rotor vane blades in the direction which is substantially perpendicular to a radial direction, the pulsation ratio can be reduced to 15% or less while suppressing the reduction of the average pressure torque. Therefore, this is more preferable.

In the above, the case of a use environment which is usual for the generator 2001 disposed in a faucet apparatus has been described. Depending on the use environment of the generator 2001 or the like, for example, the amount of water, the water pressure, the optimum rotation number of the rotor vane, or the like may be changed. Even in such a case, when the ratio of the length of the magnet in the direction which is substantially perpendicular to a radial direction, to that of the rotor vane blades in the direction which is substantially perpendicular to a radial direction is set so as to obtain a pulsation ratio of 25% or less, the increase of the pulsation width can be suppressed while suppressing the reduction of the average pressure torque. Namely, the downstream end faces of the rotor vane blades are disposed at a position where the ratio of the pulsation width to the average pressure torque received by the rotor vane is 25% or less.

Although, for the sake of convenience in description, the magnetic fluxes from the outer circumferential face of the magnet M are guided to the coil 1050 which is disposed to be opposed to the end face of the magnet M in the direction which is substantially perpendicular to a radial direction, through the inductors 1031*a*, 1032*a*, the arrangement of the coil, the magnet, and the inductors is not restricted to this. For example, a generator having "radial arrangement" in which a coil is disposed in a radially outward direction of a magnet through an inductor may be used, or a generator having "axial arrangement" in which a coil is disposed through an inductor so as to be opposed to an end face of a magnet in a direction which is substantially perpendicular to a radial direction may be used.

Figure 40:
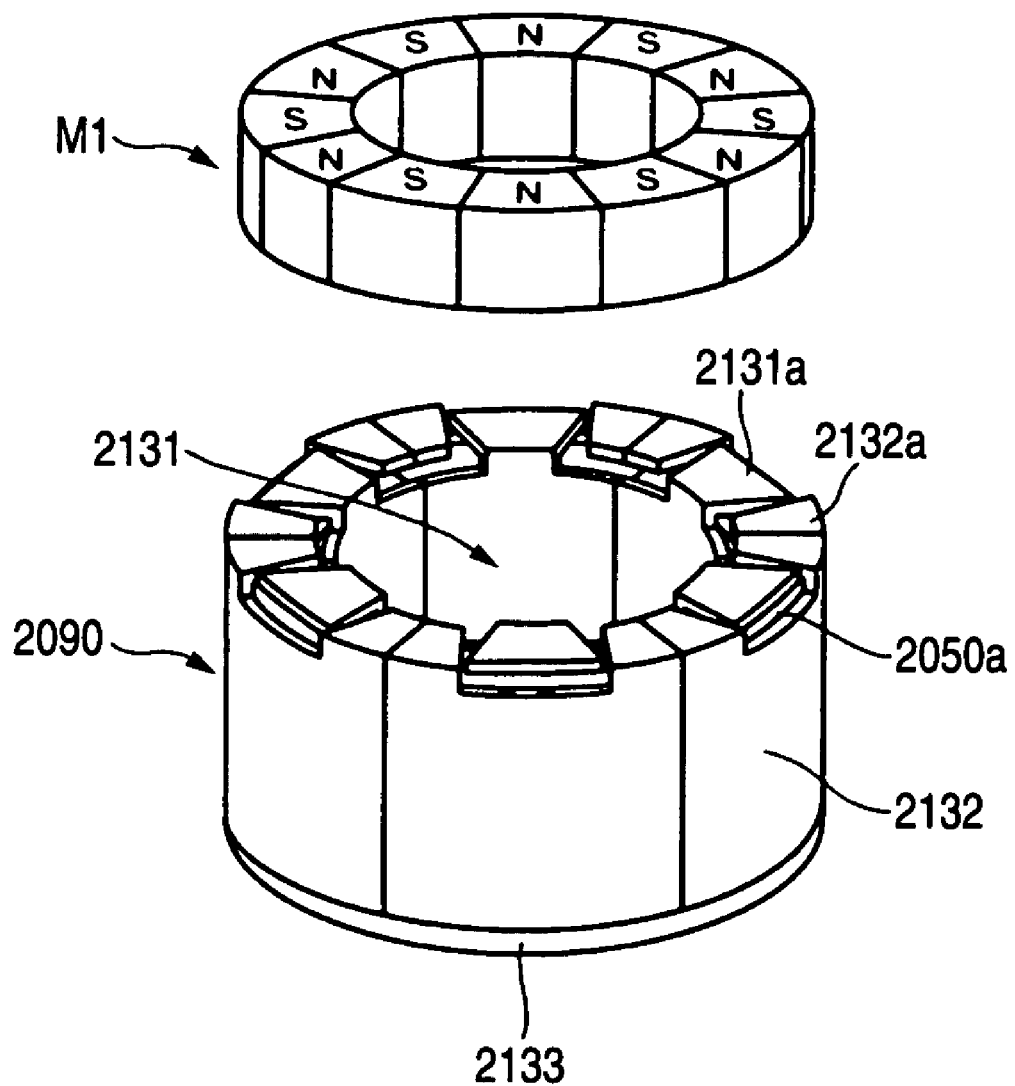
FIG. 40 is a schematic exploded view illustrating a generator having "axial arrangement".

FIG. 40 is a schematic exploded view illustrating a generator having "axial arrangement".

The end face of a magnet M1 in a direction which is substantially perpendicular to a radial direction are alternately magnetized with N and S poles along the circumferential direction.

A stator 90 has: a first yoke 2131 and second yoke 2132 all of which are made of a soft magnetic material (for example, rolled steel); inductors 2131*a*, 2132*a* which are continuously contacted with the yokes; and a coil 1050*a* which is placed in a space surrounded by the first yoke 2131, the second yoke 2132, and the inductors 2131*a*, 2132*a*. A third yoke 2133 is coupled to the end portions of the first yoke 2131 and the second yoke 2132 which are opposite to those where the inductors 2131*a*, 2132*a* are disposed.

The coil 1050*a* is disposed to be opposed to the end face of the magnet M1 in a direction which is substantially perpendicular to a radial direction. The inductors 2131*a*, 2132*a* have a portion which is opposed to the magnet M1 in a direction that is substantially perpendicular to a radial direction, and are disposed to be separated from each other.

Also in the embodiment, the radial dimension of the generator can be reduced. When the length of the rotor vane blades in a direction which is substantially perpendicular to a radial direction, and that of the magnet in a direction which is substantially perpendicular to a radial direction are set as described above, the increase of the pulsation width can be suppressed while suppressing the reduction of the average pressure torque.

For example, further members may be disposed on the outer circumferential face of the magnet M.

Next, the functions of the faucet generator and automatic faucet apparatus of the third embodiment of the invention will be described.

When the user introduces a hand under the water discharging port 6 shown in FIGS. 2 and 3, the introduction is sensed by the sensor 7, and the solenoid valve 8 is opened by the controller 57. This causes the water flow to be supplied into the cylindrical body 2013 of the generator 2001, and the water flows inside the cylindrical body 2013 to be discharged from the water discharging port 6. When the user removes the hand from the area under the water discharging port 6, the removal is sensed by the sensor 7, and the solenoid valve 8 is closed by the controller 57 to automatically stop the water flow.

The water flow flowing into the cylindrical body 2013 flows over the surface of the conical member of the pre-rotation stator vane 2014 to spread radially outward, and, in the embodiment shown in FIG. 31, is formed as a swirling flow which swirls in the rightward direction about the axis center, to flow through the stator vane channels 2071 between the stator vane blades 2018.

The swirling flow which has flown through the stator vane channels 2071 enters the rotor vane channels 2072, and impinges on the upper inclined faces of the rotor vane blades 2019. In the embodiment, the swirling flow entering the rotor vane channels 2072 is a flow which swirls in the rightward direction about the axis center, and hence a rightward force acts on the rotor vane blades 2019, so that the rotor vane 2015 is rotated in the rightward direction. The water flow which flows through the rotor vane channels 2072 that are inside the inner circumferential face of the magnet M passes through the inside of the bearing 2017, and then passes through the inside of the cylindrical body 2013 to reach the water discharging port 6.

When the rotor vane 2015 is rotated, also the magnet M fixed to the vane is rotated. As shown in FIG. 4, the radially outward end face (outer circumferential face) of the magnet M is alternately magnetized with N and S poles along the circumferential direction (rotation direction). When the magnet M is rotated, therefore, the polarities of the inductors 1031a, 1032a which are opposed to the radially outward end face (outer circumferential face) of the magnet M, and those of the first and second yokes 1031, 1032 which are continuously contacted with the inductors are changed. As a result, the directions of interlinking magnetic fluxes with respect to the coil 1050 are changed, and an electromotive force is produced in the coil 1050, thereby performing electricity generation. Also in the case exemplarily shown in FIG. 40, similarly, an electromotive force is produced in the coil 1050a. The generated power is stored into the charger 56, and then used in the driving of, for example, the solenoid valve 8, the sensor 7, and the controller 57, and the like.

Although the embodiments of the invention have been described, the invention is not restricted to the embodiments.

Also configurations where those skilled in the art apply a design change on the above-described embodiments are included within the scope of the invention as far as the configurations have the features of the invention.

In the generator and the faucet apparatus, for example, the shapes, sizes, materials, arrangements, and the like of the components are not restricted to the exemplified ones, and may be adequately changed.

The components of the above-described embodiments can be combined to the possible extent, and also configurations where they are combined are included within the scope of the invention as far as the configurations have the features of the invention.

What is claimed is:

1. A generator for faucets, the generator comprising:
   a case comprising a water inflow port and a water outflow port, wherein a water supply channel is formed inside the case;
   a rotor vane disposed inside the water supply channel and configured to rotate by receiving a water flowing inside the water supply channel;
   a magnet which is rotatable integrally with the rotor vane;
   a bearing which supports a force that the rotor vane receives due to a water flow;
   a rotation center shaft comprising one end supported by the bearing and the other end supported in a capped manner;
   a coil which produces an electromotive force by a rotation of the magnet; and
   a yoke comprising a base part arranged to surround the coil and a plurality of inductors which are spaced apart from each other and extending from the base part,
   wherein the coil is spaced apart from the magnet in an axial direction of a rotation center shaft and is disposed to face the magnet,
   the magnet is magnetized on an outer circumferential face thereof which intersects with a plane perpendicular to the rotation center shaft, and
   the inductors are disposed outside the case to face the outer circumferential face of the magnet.

2. The generator according to claim 1, wherein the coil is arranged on a downstream side of the magnet.

3. The generator according to claim 1, wherein the coil is arranged on an upstream side of the magnet.

4. The generator according to claim 1, wherein at least a portion of the case is formed of a resin.

5. The generator according to claim 1, wherein a portion of the base part corresponding a gap between the inductors is cut away along a circumferential face of the coil.

6. The generator according to claim 1, wherein the outer circumferential face of the magnet is inclined by 45 degrees or more with respect to the plane perpendicular to the rotation center shaft.

7. The generator according to claim 1, wherein each of the inductors extends along an outer circumferential face of the coil.

8. The generator according to claim 1, wherein the yoke further comprises a bent part between the base part and the inductors.

9. The generator according to claim 8, wherein the bent part comprises a curved surface.

10. The generator according to claim 1, wherein faces of the inductors facing the outer circumferential face of the magnet are flat.

11. The generator according to claim 1, wherein the inductors comprises a side which is inclined with respect to the axial direction of the rotation center shaft.

12. The generator according to claim 1, wherein the base part and the inductors are made of different materials having different magnetization characteristics.

13. The generator according to claim 1, wherein the yoke further comprises an insulating layer which is brought into contact with the coil.

14. The generator according to claim 1, wherein a portion of the inductors is positioned on an upstream side than the magnet.

15. The generator according to claim 1, wherein the rotor vane comprises a rotor vane blade which receives the force from the water flow,
   wherein a downstream end face of the rotor vane blade is positioned on an upstream side than a downstream end face of the magnet.

16. The generator according to claim 15, wherein a dimension of the magnet along the axial direction of the rotation center shaft is at least twice or more but ten or less times a dimension of the rotor vane blade along the rotation center axis of the magnet.

* * * * *